US010713196B1

(12) United States Patent  
Vu et al.

(10) Patent No.: US 10,713,196 B1  
(45) Date of Patent: Jul. 14, 2020

(54) FLEXIBLE AND SCALABLE ACCELERATOR ARCHITECTURE

(71) Applicant: INTEL CORPORATION, Santa Clara, CA (US)

(72) Inventors: Chuong Vu, Irvine, CA (US); Joseph Boccuzzi, Coto de Caza, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/227,875

(22) Filed: Dec. 20, 2018

(51) Int. Cl.
*G06F 13/28* (2006.01)
*G06F 12/0802* (2016.01)
*H04L 1/00* (2006.01)

(52) U.S. Cl.
CPC .......... *G06F 13/28* (2013.01); *G06F 12/0802* (2013.01); *H04L 1/0041* (2013.01); *G06F 2212/251* (2013.01); *G06F 2212/621* (2013.01)

(58) Field of Classification Search
CPC ............... G06F 13/28; G06F 12/0802; G06F 2212/251; G06F 2212/621; H04L 1/0041
See application file for complete search history.

(56) References Cited

U.S. PATENT DOCUMENTS

| | | | | |
|---|---|---|---|---|
| 2011/0131385 A1* | 6/2011 | Henriksson | ......... | G06F 13/1642 711/158 |
| 2015/0052332 A1* | 2/2015 | Mortensen | .......... | G06F 15/7889 712/37 |
| 2016/0087906 A1* | 3/2016 | Ohno | .................... | H04L 47/263 709/223 |
| 2017/0251517 A1* | 8/2017 | Kimura | ............... | H04W 72/044 |

* cited by examiner

*Primary Examiner* — Henry Tsai
*Assistant Examiner* — John B Roche
(74) *Attorney, Agent, or Firm* — Grossman, Tucker, Perreault & Pfleger, PLLC

(57) ABSTRACT

The present disclosure is directed to accelerator circuitry useful in a network applications, such as cloud-based radio access networks. The accelerator circuitry includes interface circuitry that couples the accelerator circuitry to each of a plurality of processor circuits and to system memory circuitry. The accelerator circuitry also includes queue management circuitry, local storage circuitry, direct memory access (DMA) circuitry, and a plurality of accelerator circuits. In operation, the processor circuit communicates a message to the queue management circuitry. The message includes pointer data and prioritized data. The queue management circuitry enqueues the message in one of a plurality of queues. The DMA circuitry receives the message and locates a descriptor at the address designed by the pointer. The DMA circuitry retrieves input data, selects an accelerator circuit, and provides the input data to the selected accelerator circuit. The accelerator circuit returns output data to the DMA circuitry, The output data is stored in system memory circuitry.

25 Claims, 19 Drawing Sheets

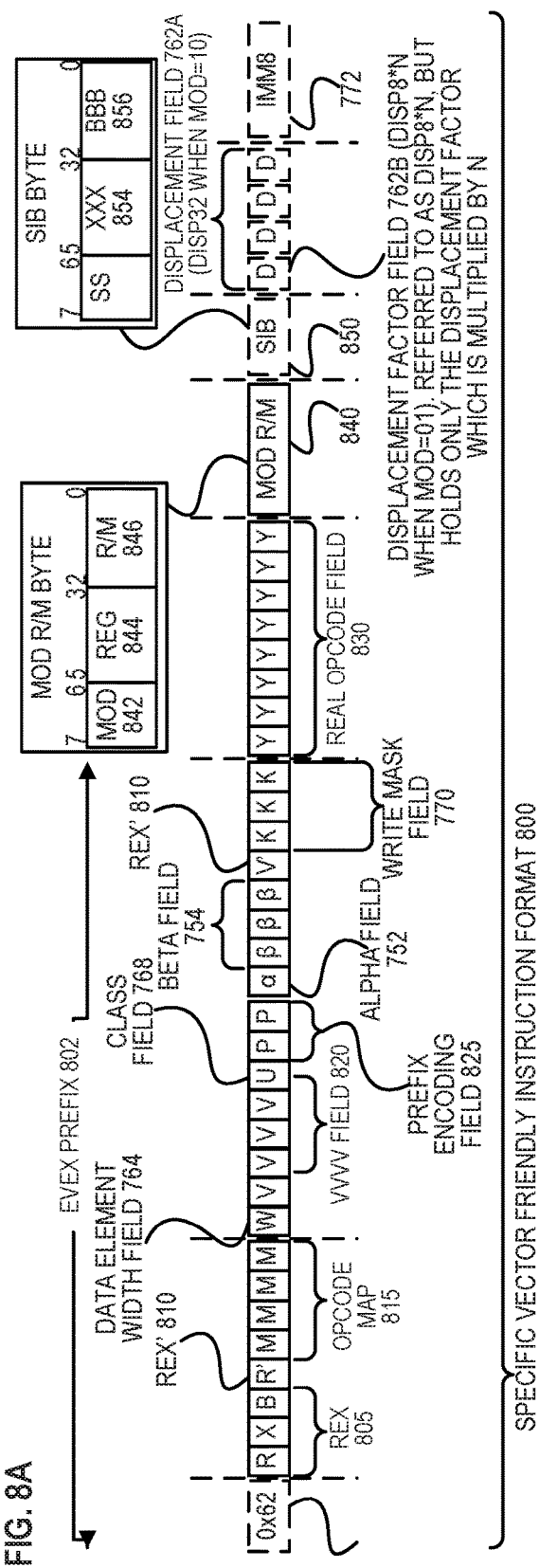
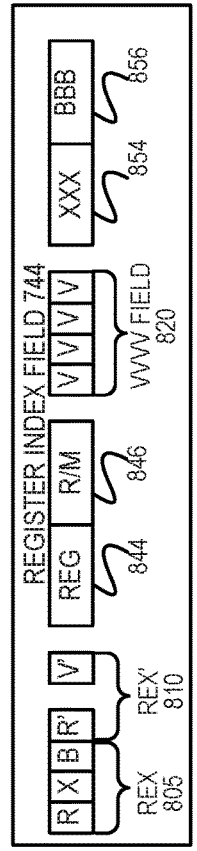
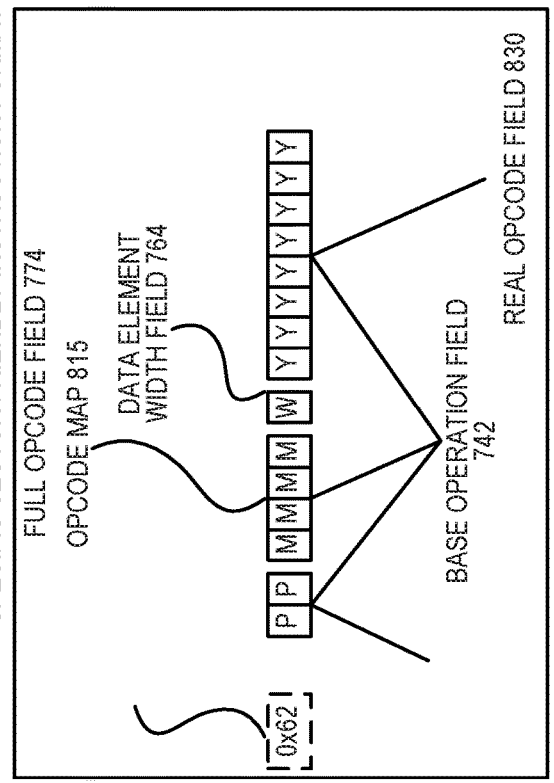
FIG. 8A
FIG. 8B
FIG. 8C

FIG. 9
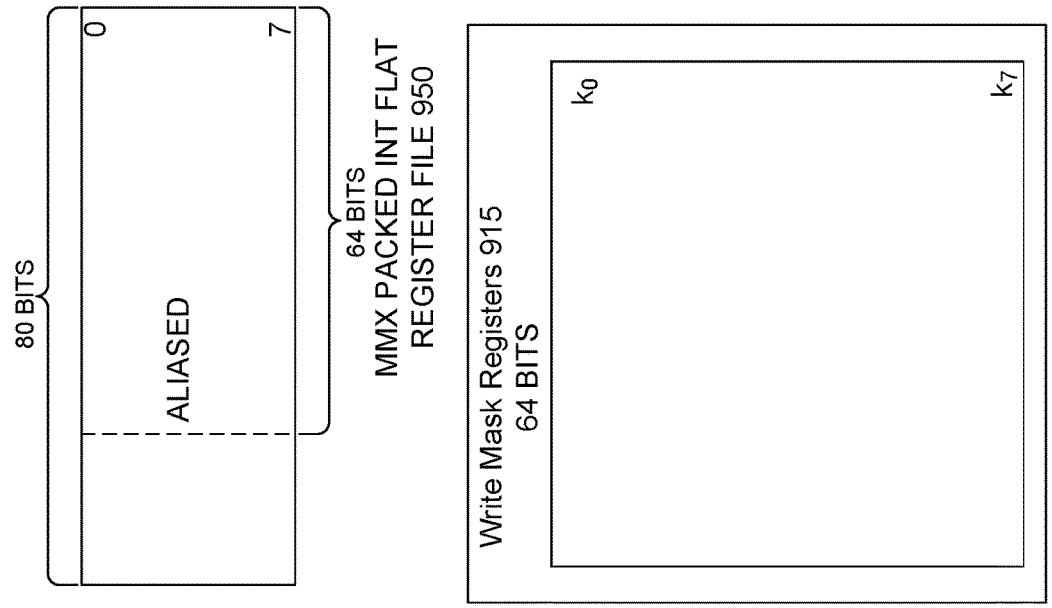
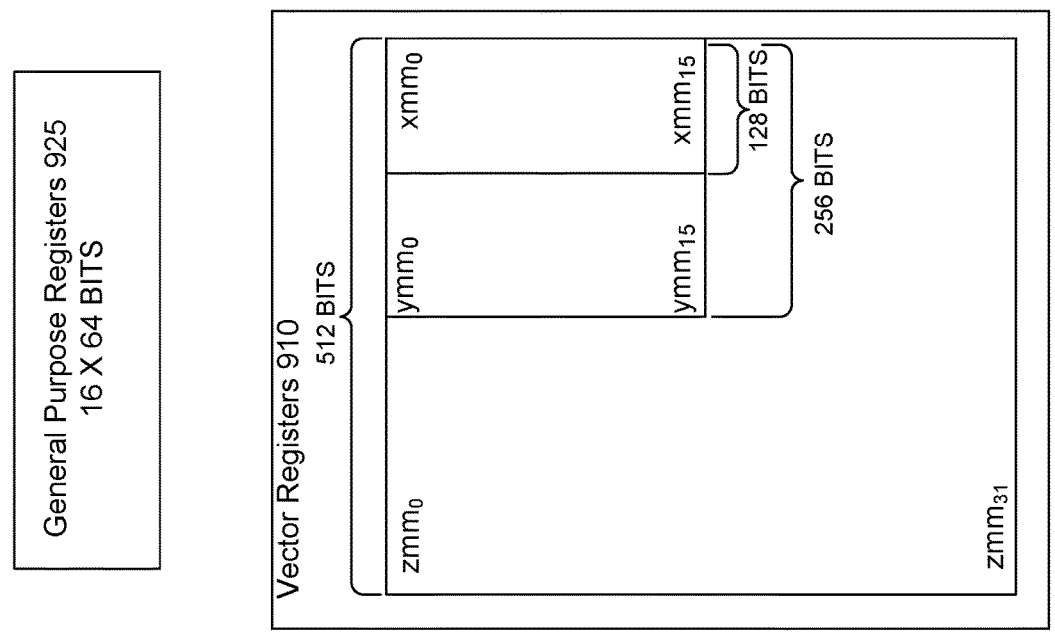

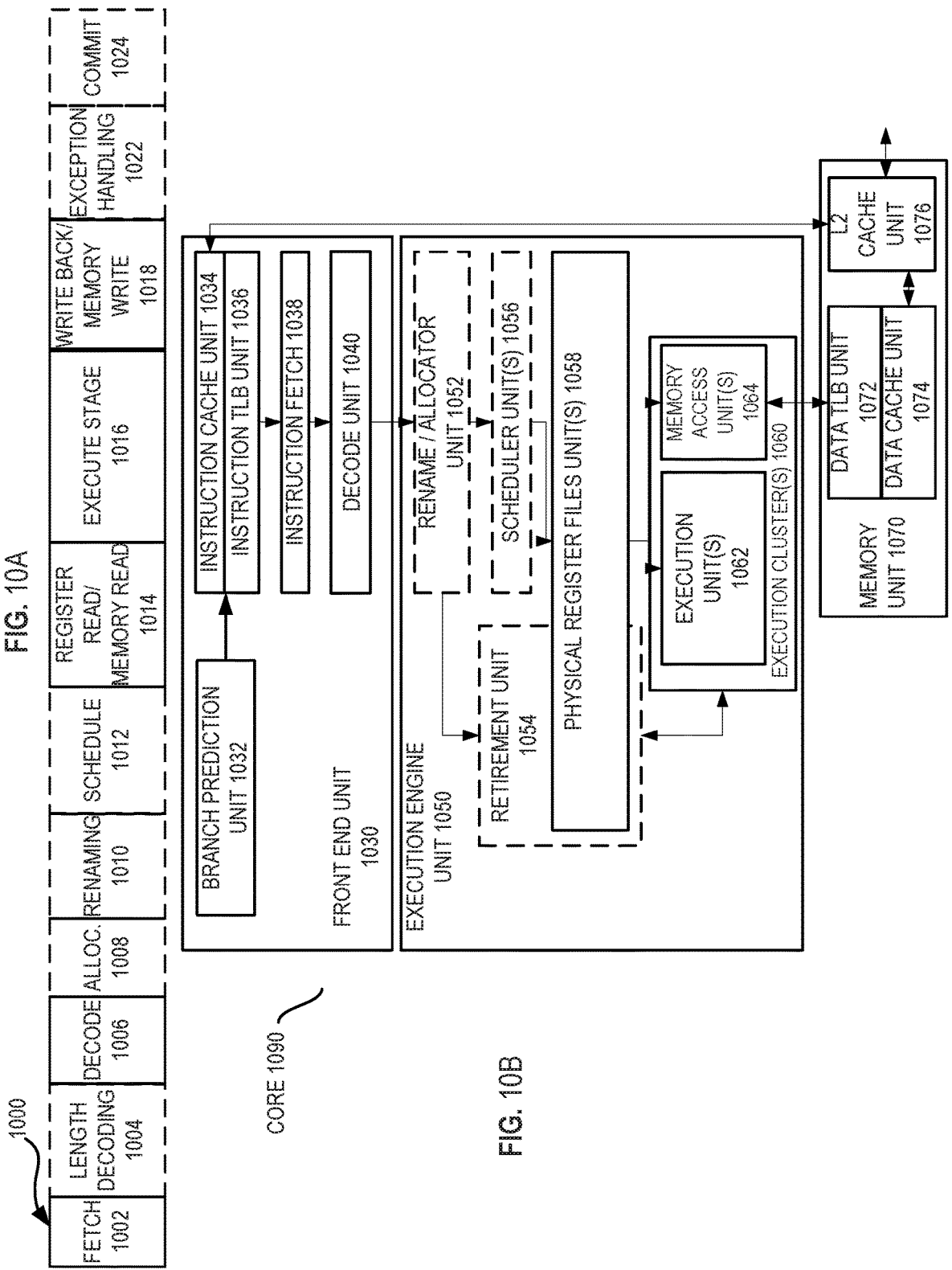

US 10,713,196 B1

FLEXIBLE AND SCALABLE ACCELERATOR ARCHITECTURE

TECHNICAL FIELD

The present disclosure relates to accelerator circuitry, more specifically network-based accelerator circuitry.

BACKGROUND

Accelerators are typically used to improve the performance of computer systems by offloading computationally intensive operations from the central processing unit(s) thereby freeing the CPUs to perform additional operations while the computationally intensive operations are performed concurrently by the accelerator. Prior solutions have used custom application-specific integrated circuits (ASICs) that included micro-controllers and digital signal processors (DSPs) to offload computationally intensive operations from the CPU. However, with the ever-increasing emphasis on cloud based services and solutions, the focus is shifting from device-level acceleration to cloud-based, server-level acceleration. In particular, given the ubiquity of cloud-based services, a strong preference exists for commercial, off-the-shelf (COTS) based solutions.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 8A, FIG. 8B, FIG. 8C, and FIG. 8D are block diagrams illustrating an exemplary specific vector friendly instruction format according to embodiments of the invention;

FIG. 9 is a block diagram of a register architecture according to one embodiment of the invention;

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention;

Figure 1:
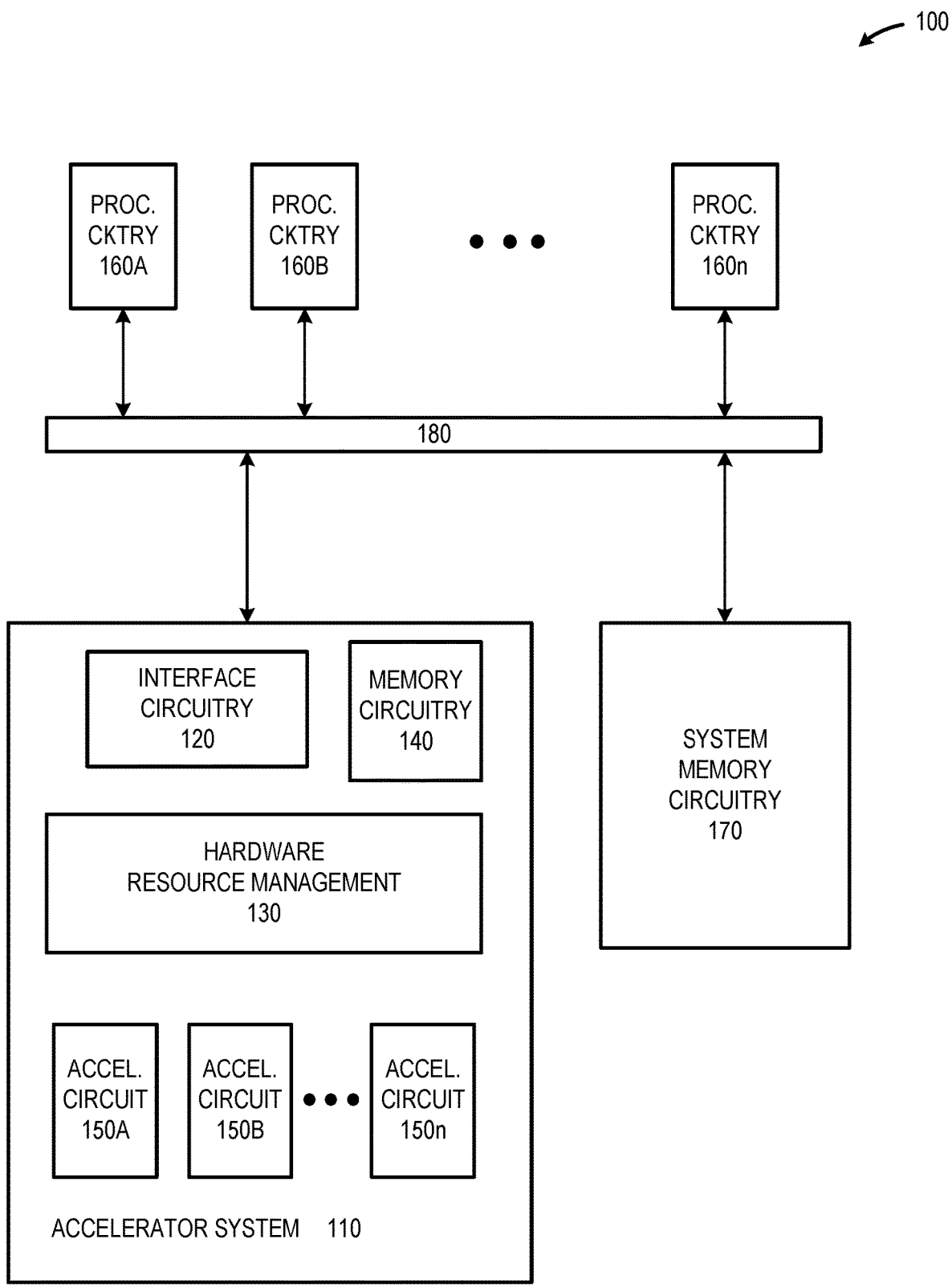
FIG. 1 is a block diagram of an illustrative system that includes an accelerator system that includes interface circuitry, hardware resource management circuitry, memory circuitry, and a plurality of accelerator circuits that appear as a single logical element or entity to each of a plurality of processor circuits, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

To implement a conventional cloud-based accelerator would require a significant number of CPUs that would detrimentally increase implementation cost and power consumption. The systems and methods described herein employ an accelerator architecture that appears as a single logical function when exposed to a cloud-based, multi-core, system-on-chip (SoC). Use of such an architecture removes the implementation hurdle and beneficially facilitates the cloud-based implementation of computationally intensive operations, such as 4G and 5G forward error correction (FEC). The systems and methods disclosed herein thus beneficially permit the delivery of cloud-based, radio access network (RAN) services. The systems and methods disclosed herein may employ software defined networking (SDN) methodologies, such as virtualization and slicing, in a highly efficient manner. The systems and methods disclosed herein advantageously provide a simplified architectural solution since resource allocation (e.g., allocation/scheduling of accelerator circuits) is performed within the accelerator system and all of the accelerator circuits are represented as a single logical function. Such an accelerator system offers multiple advantages including: efficiency gained through hardware-based scheduling and priority queue support; flexibility gained through the use of specific accelerator hardware designed for specific applications; and scalability gained through the optimized utilization of a common accelerator hardware pool shared by and/or across multiple CPUs.

The systems and methods disclosed herein enhance efficiency by representing and managing a pool of hardware resources, including a pool of accelerator circuits, as a single logical entity to each of a plurality of CPUs. Such an arrangement enhances overall system efficiency by managing the pool of hardware resources internally using a hardware based scheduler, thereby providing an efficient use of parallel hardware resources. When combined with a high priority queue and a low priority queue, such an accelerator system reduces system latency and improves system responsiveness and performance.

The systems and methods disclosed herein enhance flexibility by providing the ability to support different types of accelerators, such as 4G FEC, 5G FEC, and 5G demodulation, as well as future expandability to accommodate accelerators subsequently deemed desirable. The systems and methods disclosed herein improve system scalability by supporting a different number of accelerators of the same type that target different SoC requirements. System performance may be selectively increased or decreased by instantiating a greater or lesser number of hardware resources to support parallel processing. Further, through the use of clock and power domain gating techniques, the number and types of hardware accelerators may be selectively and dynamically optimized to meet computational demands.

An accelerator is provided. The accelerator may include: queue manager circuitry to: receive a request that includes information indicative of a priority and data representative of a pointer to a first location in system memory circuitry; and enqueue the pointer to one of a plurality of queue circuits: a plurality of accelerator circuits; direct memory access (DMA) circuitry coupled to the plurality of accelerator circuits, the DMA circuitry to: receive the pointer from the queue manager circuitry; read data at the first location in the system memory circuitry; fetch input data from a second location in the system memory circuitry; select one of the plurality of accelerator circuits; provide the input data to the selected one of the plurality of accelerator circuits; receive output data from the selected one of the plurality of accelerator circuits; and transfer the output data to a third memory location in the system memory circuitry.

A server system that includes an accelerator system is provided. The system may include: a plurality of processor circuits; system memory circuitry; and a cloud-based radio access network (C-RAN) accelerator, that includes: queue manager circuitry to: receive a request that includes information indicative of a priority and data representative of a pointer to a first location in system memory circuitry; and enqueue the pointer to one of a plurality of queue circuits. The system may further include: a plurality of accelerator circuits; direct memory access (DMA) circuitry coupled to the plurality of accelerator circuits, the DMA circuitry to: receive the pointer from the queue manager circuitry; read data at the first location in the system memory circuitry; fetch input data from a second location in the system memory circuitry; select one of the plurality of accelerator circuits; provide the input data to the selected one of the plurality of accelerator circuits; receive output data from the selected one of the plurality of accelerator circuits; and transfer the output data to a third memory location in the system memory circuitry.

An acceleration method is provided. The method may include: receiving, by queue management circuitry, a request that includes information indicative of a priority and data representative of a pointer to a first location in system memory circuitry; enqueuing, by the queue management circuitry, the pointer to one of a plurality of queue circuits; receiving, by direct memory access (DMA) circuitry, the pointer from the queue manager circuitry; reading, by the DMA circuitry, data at the first location in the system memory circuitry; fetching, by the DMA circuitry, input data from a second location in the system memory circuitry; selecting, by the DMA circuitry, one of a plurality of communicably coupled accelerator circuits; providing, by the DMA circuitry, the input data to the selected one of the plurality of accelerator circuits; receiving, by the DMA circuitry, output data from the selected one of the plurality of accelerator circuits; and transferring, by the DMA circuitry, the output data to a third memory location in the system memory circuitry.

An acceleration system is provided. The system may include: means for receiving a request that includes information indicative of a priority and data representative of a pointer to a first location in system memory circuitry; means for enqueuing the pointer to one of a plurality of queue circuits; means for receiving the pointer from the queue manager circuitry; means for reading data at the first location in the system memory circuitry; means for fetching input data from a second location in the system memory circuitry; means for selecting one of a plurality of communicably coupled accelerator circuits; means for providing the input data to the selected one of the plurality of accelerator circuits; means for receiving output data from the selected one of the plurality of accelerator circuits; and means for transferring the output data to a third memory location in the system memory circuitry.

A non-transitory, machine-readable, storage device is provided. The non-transitory machine-readable storage device may include instructions that, when executed by cloud-based radio access network (C-RAN) circuitry, cause the C-RAN circuitry to: receive a request that includes information indicative of a priority and data representative of a pointer to a first location in system memory circuitry; enqueue the pointer to one of a plurality of queue circuits; receive the pointer from the queue manager circuitry; read data at the first location in the system memory circuitry; fetch input data from a second location in the system memory circuitry; select one of a plurality of communicably coupled accelerator circuits; provide the input data to the selected one of the plurality of accelerator circuits; receive output data from the selected one of the plurality of accelerator circuits; and transfer the output data to a third memory location in the system memory circuitry.

As used herein the terms "about" or "approximately" when used to prefix an enumerated value should be interpreted to indicate a value that is plus or minus 15% of the enumerated value. Thus, a value that is listed as "about 100" or "approximately 100%" should be understood to represent a value that could include any value or group of values between 85 (i.e., −15%) to 115 (i.e., +15%).

As used herein the term "processor circuit" may refer to the physical circuitry included in a microprocessor or central processing unit (CPU), a virtual instantiation of a processor on physical circuitry included in a microprocessor or CPU, or combinations thereof. The term processor circuit may refer to a single- or multi-thread processor core circuit.

FIG. 1 is a block diagram of an illustrative system 100 that includes an accelerator system 110 that includes interface circuitry 120, hardware resource management circuitry 130, memory circuitry 140, and a plurality of accelerator circuits 150A-150n (collectively, "accelerator circuits 150"); that appear as a single logical element or entity to each of a plurality of processor circuits 160A-160*n* (collectively, "processor circuits 160"), in accordance with at least one embodiment described herein. The hardware resource management circuitry 130 promptly and efficiently allocates hardware resources, such as accelerator circuits 150, in an efficient manner that may be based, in whole or in part, on the relative age, quality of service (QoS), and/or priority of the operation(s) included in the request received from each of the plurality of processor circuits 160. In embodiments, the hardware resource management circuitry 130 may generate one or more operation queues containing the operation(s) requested by the processor circuits 160. As the requested operation(s) included in the one or more queues are executed, the accelerator system 110 receives the operation(s), determines the location in system memory circuitry 170 of the data associated with a respective operation. The accelerator system 110 transfers the data associated with the respective operation from the system memory circuitry 170 to the memory circuitry 140 included in the accelerator system 110, for example via direct memory access (DMA). An accelerator circuit 150 performs the respective operation and the result is returned to system memory circuitry 170.

The accelerator system 110 beneficially permits shared access to hardware resources, such as the accelerator circuits 150, for each of the plurality of processor circuits 160. The processor circuits 160 are able to access the shared hardware resources without increasing the computational loading on the respective processor circuit 160. In addition, specialized accelerator circuits 150 may be shared across the plurality of processor circuits 160 thereby enabling a significant reduction in the number of accelerator circuits required, reducing both cost and semiconductor package real estate requirements. In an illustrative embodiment, on a CPU having twenty cores (i.e., 20 processing circuits 160), a pool of five 5G forward error correction (FEC) accelerators may be allocated by the scheduling circuitry and shared across all of the processor circuits 160. This represents a significant savings in both cost and semiconductor die real estate when compared to provision of a dedicated accelerator circuit 150 for 5G FEC to each of the twenty cores (i.e., 20 accelerator circuits 150). In addition, the accelerator system 110 may expanded to accommodate the development of future specialized accelerator circuits. In embodiments, the accelerator system 110 may include one or more cloud-based devices, such as one or more accelerator systems included in a cloud-radio access network (Cloud-RAN) system that performs 4G and/or 5G wireless signal processing and/or forward error correction (FEC).

In embodiments, the accelerator system 110 may be disposed in, on, across, or about one or more semiconductor dies. In embodiments, the accelerator system 110, including the interface circuitry 120, the hardware resource management circuitry 130, the memory circuitry 140, and the accelerator circuits 150 may be disposed on a single semiconductor die that is incorporated into a system-on-chip (SoC) or multi-chip module (MCM) semiconductor package. In embodiments, all or a portion of the accelerator system 110 may be formed, patterned, deposited, and/or disposed on a semiconductor die that includes at least a portion of the plurality of processor circuits 160. In other embodiments, all or a portion of the accelerator system 110 may be formed, patterned, deposited, and/or disposed on a separate die communicably coupled to the plurality of processor circuits 160.

A bus 180 communicably couples the accelerator system 110 to the plurality of processor circuits 160. The accelerator system 110 appears as a single logical entity to each of the plurality of processor circuits 160. At a high level, when in operation, the processor circuits 160 communicate requests for accelerator hardware support to the accelerator system 110. The interface circuitry 120 receives the requests for accelerator hardware support. Based at least on time of receipt and the relative priority of each request, the scheduler circuitry 130 selects an appropriate accelerator circuit 150 and establishes a queue or similar ordered execution sequence for performing the operation associated with each request. Input data associated with a memory address in system memory circuitry 170 may be transferred, via DMA, to the accelerator system memory circuitry 140. Upon completion of the operation by the accelerator circuitry 150, the output data may be transferred from the accelerator system memory circuitry 140 to the system memory circuitry 170. In embodiments, the output data may be transferred from the accelerator system memory circuitry 140 to the system memory circuitry 170 via DMA. In embodiments, the output data may be transferred from the accelerator system memory circuitry 140 to the original address of the input data in the system memory circuitry 170. Upon completion of the acceleration operation, the accelerator system 110 may provide an indication (e.g., via an IRQ) to the originating processor circuit 160 that the operation is complete and updated data has been stored in or otherwise transferred to a designated address in system memory circuitry 170.

The interface circuitry 120 may include any number and/or combination of electrical components, semiconductor devices, and/or logic elements capable of facilitating the bidirectional exchange of information between the accelerator system 110 and one or more devices and/or systems external to the accelerator system 110. In embodiments, the interface circuitry 120 may facilitate the bidirectional exchange of information and/or data between the accelerator system 110 and the processor circuits 160. In embodiments, the interface circuitry 120 may facilitate the bidirectional exchange of information and/or data between the accelerator system 110 and the system memory circuitry 170. In some implementations, the interface circuitry 120 may exchange information and/or data with the system memory circuitry 170 via DMA. In embodiments, the interface circuitry 120 may communicate information and/or data between the accelerator system 110 and the system memory circuitry 170 in the form of one or more logical structures, such as frames.

The hardware resource management circuitry 130 may include any number and/or combination of electrical components, semiconductor devices, and/or logic elements capable of executing machine readable instructions stored on one or more non-transitory storage devices. In embodiments, the hardware resource management circuitry 130 may form all or a portion of one or more application specific integrated circuits (ASICs), digital signal processors (DSPs), field programmable gate arrays (FPGAs), or reduced instruction set computers (RISCs). When executed, the machine readable instructions may cause the hardware resource management circuitry 130 to perform various functions or acts that include but are not limited to:

causing a retrieval of input data from the system memory circuitry 170 based on a received request for access to a hardware resource;

selecting an appropriate hardware resource within the accelerator system 110 based on one or more parameters that include but are not limited to: order of receipt, time of receipt, QoS requirements, and/or requested priority;

causing the generation of output data by causing the selected hardware resource to perform the requested operation(s);

causing a storage of the output data at a defined location in the system memory circuitry; and notifying the processor circuit 160 that originated the respective hardware resource access request that the output data has been loaded into system memory circuitry and/or processor cache memory circuitry.

The accelerator system memory circuitry 140 includes any number and/or combination of electrical components, semiconductor devices, and/or logic elements capable of storing input data transferred from the system memory circuitry 170 and/or output data for transfer to the system memory circuitry 170. In embodiments, the accelerator system memory circuitry 140 may include any number and/or combination of storage devices such as random access memory (RAM); static RAM (SRAM); dynamic RAM (DRAM); or combinations thereof. The accelerator system memory circuitry 140 may have any storage capacity. For example, the accelerator system memory circuitry 140 may have a storage capacity of about: 64 kilobytes (KB) or less; 128 KB or less; 256 KB or less; 512 KB or less; 1 megabyte (MB) or less; 5 MB or less; or 20 MB or less. In embodiments, input data may be transferred from the system memory circuitry 170 to the accelerator system memory circuitry 140 over bus 180 via DMA. In embodiments, output data may be transferred from the accelerator system memory circuitry 140 to the system memory circuitry 170 over bus 180 via DMA.

Each of the plurality of accelerator circuits 150A-150n includes any number and/or combination of electrical components, semiconductor devices, and/or logic elements capable of generating output data by performing computationally intensive operations on input data. In embodiments, each of the accelerator circuits 150 may include similar or identical components. For example, each of the accelerator circuits 150 may include electrical components, semiconductor devices, and/or logic elements capable of performing a large number of computationally intensive vector or tensor operations. In other embodiments, the accelerator circuits 150 may be formed into a plurality of sub-groups, where each of the plurality of sub-groups includes accelerator circuits 150 having similar or identical functionality or capability. For example, a first sub-group may include a plurality of accelerator circuits 150 optimally configured to perform 4G FEC; a second sub-group may include a plurality of accelerator circuits 150 optimally configured to perform 5G FEC; and a third sub-group may include a plurality of accelerator circuits optimally configured to perform 5G Maximum Likelihood Detection (MLD). Each of the sub-groups may contain a similar number or different numbers of accelerator circuits 150. In yet other embodiments, each of the plurality of accelerator circuits 150 may be optimally configured to perform different functions or to provide different capabilities.

The plurality of processor circuits 160A-160n includes any number and/or combination of electrical components, semiconductor devices, and/or logic elements capable of executing machine-readable instructions. Some or all of the plurality of processor circuits 160 may include execution of machine-readable instructions that cause an instantiation of a virtual machine by the respective processor circuit 160. In embodiments, each of the processor circuits 160 may include a single- or multi-thread processor core. In embodiments, at least a portion of the processor circuits 160 may be implemented as processing cores within a multi-core microprocessor. In embodiments, the processor circuits 160 may be disposed in a portable processor-based device, a desktop processor device, or a cloud-based device such as a blade-mount server. The plurality of processor circuits 160A-160n may be disposed in and/or configured as a semiconductor package. For example, some or all of the processor circuits 160 may be disposed in configurations such as: a system-on-chip (SoC); a multi-chip module (MCM); a system-in-package (SiP); a network-on-chip; a programmable system-on-chip; an application specific instruction set processor (ASH)); and similar.

The system memory circuitry 170 includes any number and/or combination of electrical components, semiconductor devices, optical storage devices, quantum storage devices, molecular storage devices, atomic storage devices, and/or logic elements capable of storing information and/or data. All or a portion of the system memory circuitry 170 may include transitory memory circuitry, such as RAM, DRAM, SRAM, or similar. All or a portion of the system memory circuitry 170 may include non-transitory memory circuitry, such as: optical storage media; magnetic storage media; NAND memory; and similar. The system memory circuitry 170 may be dedicated storage for the plurality of processor circuits 160 or may serve as multiple pluralities of processor circuits (i.e., shared storage). In embodiments, at least a portion of the system memory circuitry 170 may include processor cache memory circuitry, such as L1 cache memory circuitry, L2 cache memory circuitry, and/or last or lowest level cache (LLC) memory circuitry. The system memory circuitry 170 may include one or more storage devices having any storage capacity. For example, the system memory circuitry 170 may include one or more storage devices having a storage capacity of about: 512 kilobytes or greater; 1 megabyte (MB) or greater; 100 MB or greater; 1 gigabyte (GB) or greater; 100 GB or greater; 1 terabyte (TB) or greater; or about 100 TB or greater.

Figure 2:
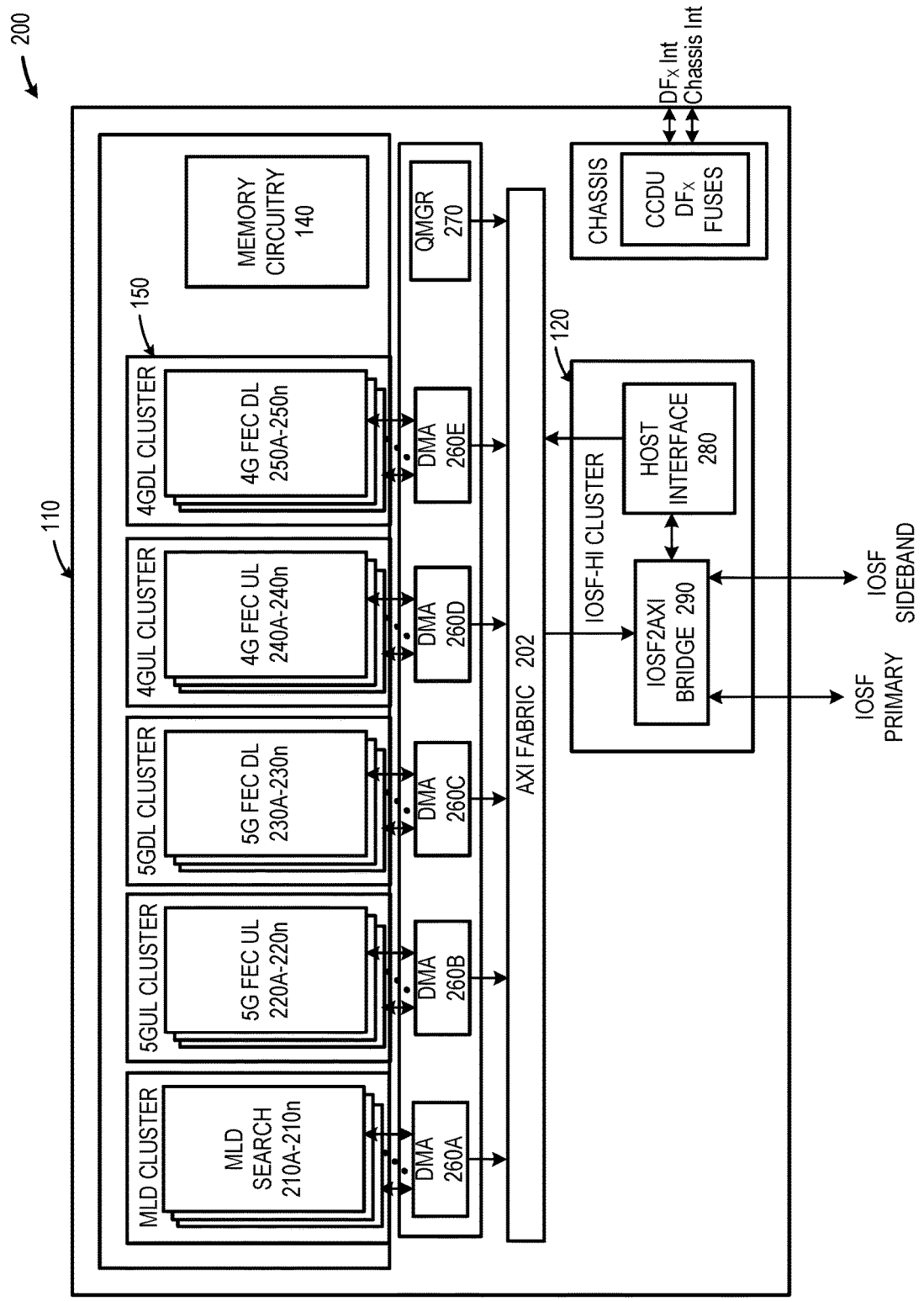
FIG. 2 is a schematic diagram of an illustrative accelerator system that includes hardware resources such as one or more 5G MLD accelerator circuits; one or more 5G FEC uplink accelerator circuits; one or more 5G FEC downlink accelerator circuits; one or more 4G FEC uplink accelerator circuits; and one or more 4G FEC downlink accelerator circuits, in accordance with at least one embodiment described herein.

FIG. 2 is a schematic diagram of an illustrative accelerator system 200 that includes hardware resources such as one or more 5G MLD accelerator circuits 210A-210n; one or more 5G FEC uplink accelerator circuits 220A-220n; one or more 5G FEC downlink accelerator circuits 230A-230n; one or more 4G FEC uplink accelerator circuits 240A-240n; and one or more 4G FEC downlink accelerator circuits 250A-250n, in accordance with at least one embodiment described herein. In embodiments, the hardware resource management circuitry 130 may include DMA control circuitry that is associated with each plurality of accelerator circuits. For example, as depicted in FIG. 2, DMA circuitry 260A is coupled to each of the one or more 5G MLD accelerator circuits 210; DMA circuitry 260B is coupled to each of the one or more 5G FEC UL accelerator circuits 220; DMA circuitry 260C is coupled to each of the one or more 5G FEC DL accelerator circuits 230; DMA circuitry 260D is coupled to each of the one or more 4G FEC UL accelerator circuits 240; and DMA circuitry 260E is coupled to each of the one or more 4G FEC DL accelerator circuits 250. Although not depicted in FIG. 2, other protocols, such as 3G, may also be supported using the acceleration systems and methods described herein. As depicted in FIG. 2, the hardware resource management circuitry 130 may also include queue management circuitry 270. The accelerator system 200 includes accelerator system memory circuitry 140. The interface circuitry 120 includes host interface circuitry 280 and bridge circuitry 290 to bidirectionally convert external communication from a host format to a format compatible with an internal bus 202.

As depicted in FIG. 2, the internal bus 202 communicably couples the interface circuitry 120, the direct memory access (DMA) circuits 260A-260E, and the hardware resource management circuitry 130. In embodiments, the internal bus 202 may have any width and may use any bus communication protocol and/or architecture. For example, in some embodiments, the internal bus 202 may have a width of up to 512 bits and may use an Advanced eXetensible Interface (AXI) communication protocol. The accelerator system 200 beneficially performs computationally intensive operations using scalable cloud based hardware solutions.

The accelerator system 200 may include any number of 5G MLD accelerator circuits 210A-210n (collectively, "5G MLD accelerator circuits 210"). Each of the 5G MLD accelerator circuits 210 may include any number and/or combination of electrical components, semiconductor devices, and/or logic elements capable of performing maximum likelihood detection on data associated with at least one 5G wireless signal received by the device coupled to the accelerator system 200. As depicted in FIG. 2, in embodiments, DMA circuitry 260A manages the bidirectional communication of information and/or data between the 5G MLD accelerator circuits 210 and other systems and/or devices coupled to the internal bus 202.

The accelerator system 200 includes any number of 5G forward error correction uplink accelerator circuits 220A-220n (collectively, "5G FEC UL accelerator circuits 220"). Each of the 5G FEC UL accelerator circuits 220 may include any number and/or combination of electrical components, semiconductor devices, and/or logic elements capable of performing forward error correction operations on all or a portion of the uplink data associated with at least one 5G wireless signal processed by the device coupled to the accelerator system 200. As depicted in FIG. 2, in embodiments, DMA circuitry 260B manages the bidirectional communication of information and/or data between the 5G FEC UL accelerator circuits 220 and other systems and/or devices coupled to the internal bus 202.

The accelerator system 200 includes any number of 5G forward error correction downlink accelerator circuits 230A-230n (collectively, "5G FEC DL accelerator circuits 230"). Each of the 5G FEC DL accelerator circuits 230 may include any number and/or combination of electrical components, semiconductor devices, and/or logic elements capable of performing forward error correction operations on all or a portion of the downlink data associated with at least one 5G wireless signal processed by the device coupled to the accelerator system 200. As depicted in FIG. 2, in embodiments, DMA circuitry 260C manages the bidirectional communication of information and/or data between the 5G FEC DL accelerator circuits 230 and other systems and/or devices coupled to the internal bus 202.

The accelerator system 200 includes any number of 4G forward error correction uplink accelerator circuits 240A-240n (collectively, "4G FEC UL accelerator circuits 240"). Each of the 4G FEC UL accelerator circuits 240 may include any number and/or combination of electrical components, semiconductor devices, and/or logic elements capable of performing forward error correction operations on all or a portion of the uplink data associated with at least one 4G wireless signal processed by the device coupled to the accelerator system 200. As depicted in FIG. 2, in embodiments, DMA circuitry 260D manages the bidirectional communication of information and/or data between the 4G FEC UL accelerator circuits 240 and other systems and/or devices coupled to the internal bus 202.

The accelerator system 200 includes any number of 4G forward error correction downlink accelerator circuits 250A-250n (collectively, "4G FEC DL accelerator circuits 250"). Each of the 4G FEC DL accelerator circuits 250 may include any number and/or combination of electrical components, semiconductor devices, and/or logic elements capable of performing forward error correction operations on all or a portion of the downlink data associated with at least one 4G wireless signal processed by the device coupled to the accelerator system 200. As depicted in FIG. 2, in embodiments, DMA circuitry 260E manages the bidirectional communication of information and/or data between the 4G FEC DL accelerator circuits 250 and other systems and/or devices coupled to the internal bus 202.

DMA circuits 260A-260n (collectively, "DMA circuits 260") include any number and/or combination of electrical components, semiconductor devices, and/or logic elements capable of executing machine-readable instructions to cause a bidirectional transfer of information and/or data between the accelerator circuits 150 and the internal bus 202. In embodiments, the machine-executable instructions may further cause the DMA circuits 260 to allocate operations to each of the accelerator circuits 150 based, at least in part, on a priority level of the operation, a quality of service associated with the operation, an order of receipt associated with the operation, or combinations thereof. The DMA circuits 260 beneficially cause a transfer of information and/or data such as descriptors, input data, and/or output data between the internal bus 202 and a selected accelerator circuit to which the respective DMA circuit 260A-260E is coupled. In embodiments, the information and/or data on the internal bus 202 may include descriptors, input data, and/or output data transferred between the system memory circuitry 170 and the accelerator system 200.

When the accelerator system 200 depicted in FIG. 2 is in operation, the interface circuitry 120 receives memory pointer data from at least some of the plurality of processor circuits 160. The memory pointers provided by each processor circuit 160 includes data representative of an address in the system memory circuitry 170 that includes data representative of a DMA descriptor. The received pointer data is written to the accelerator system memory circuitry 140. Using the memory pointer data stored in the accelerator system memory circuitry 140, the DMA circuit 260 associated with the appropriate accelerator circuit 210, 220, 230, 240, 250 fetches the DMA descriptor from the system memory circuitry 170 and assigns the associated operation(s) to the next available accelerator circuit 210, 220, 230, 240, 250. The DMA circuit 260 then fetches input data to permit the accelerator circuitry 210, 220, 230, 240, 250 to perform the operation(s) on the input data. After completing the operation(s), the DMA circuit 260 takes the output data generated by the accelerator circuit 210, 220, 230, 240, 250 and places the output data at a defined location in the system memory circuitry 170.

In embodiments, the hardware resource management circuitry 130 includes queue management circuitry 270. The queue management circuitry 270 includes any number and/or combination of electrical components, semiconductor devices, and/or logic elements capable of executing machine-readable instructions to cause queue operations received from processor circuits 160 using one or more defined queuing protocols. Such queuing protocols may include but are not limited to: priority based queuing; quality of service based queuing; class of service based queuing; time of receipt based queuing; estimated execution time based queuing; or combinations thereof. In embodiments, the queue management circuitry 270 may be disposed at least partially in the hardware resource management circuitry 130. In other embodiments, the queue management circuitry 130 may be disposed remote from the hardware resource management circuitry 130.

The accelerator system 200 includes interface circuitry 120. In embodiments, the interface circuitry 120 includes host interface circuitry 280 and bridge circuitry 290. In embodiments, the host interface circuitry 280 includes any number and/or combination of electrical components, semiconductor devices, and/or logic elements capable of facilitating communication between the accelerator system 200 and the host device coupled to the accelerator system 200. In embodiments, the bridge circuitry 290 includes any number and/or combination of electrical components, semiconductor devices, and/or logic elements capable of facilitating communication between the accelerator system internal bus 202 and an external communication fabric, such as one or more buses used by the processor circuits 160. In embodiments, the bridge circuitry 290 may perform bus protocol conversion and security checking. For example, the bridge circuitry 290 may convert, translate, or otherwise facilitate the exchange of data between one or more internal devices or systems, such as the host interface 280 and/or the acceleration system internal bus 202, and one or more external devices or systems, such as an Intel On-Chip System Fabric (IOSF).

Figure 3:
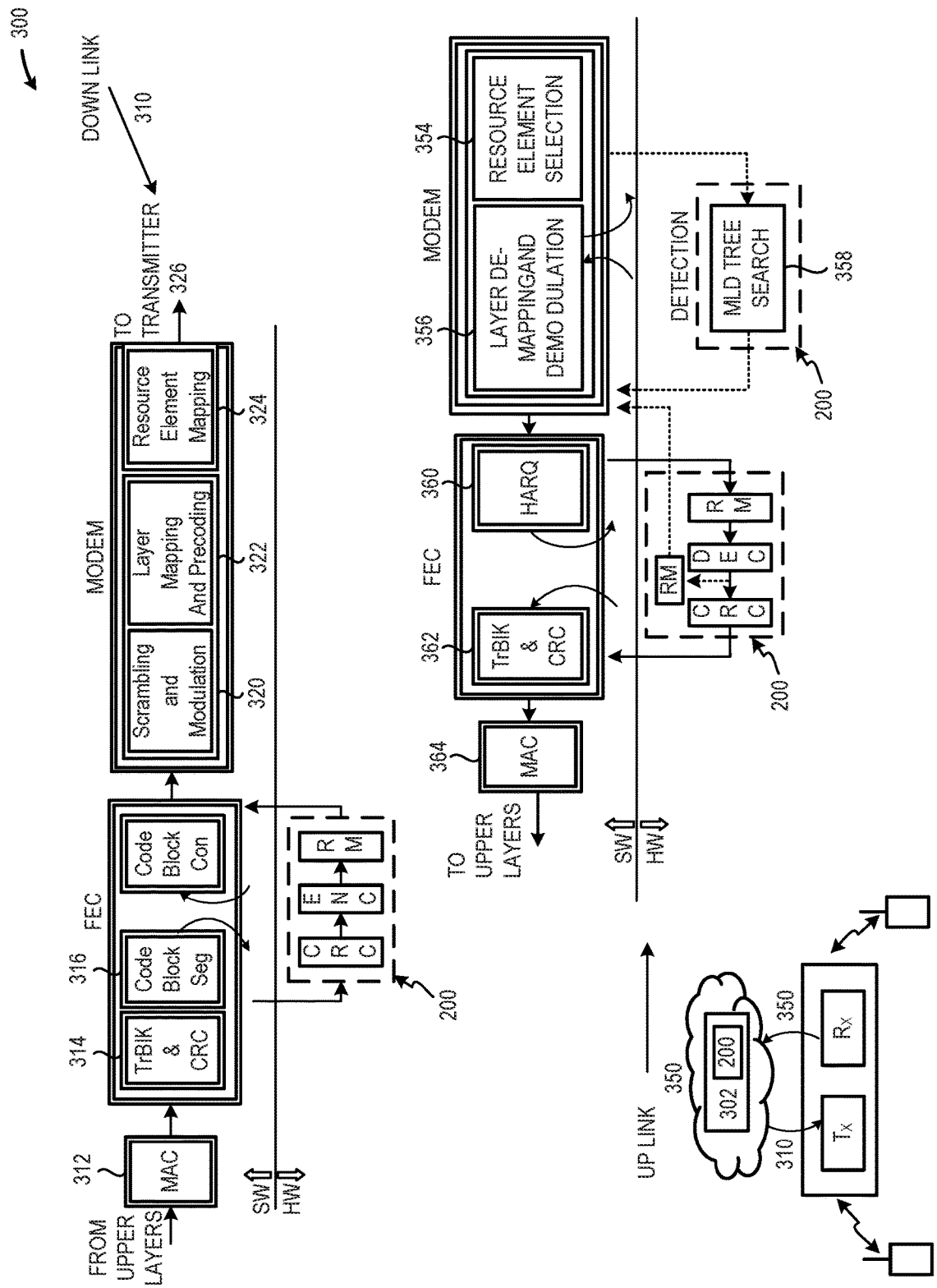
FIG. 3 is a block flow diagram of an illustrative accelerator system in which a accelerator system performs computation intensive operations during an illustrative downlink and during an illustrative uplink, in accordance with at least one embodiment described herein.

FIG. 3 is a block flow diagram of an illustrative system 300 in which an accelerator system 200 performs computation intensive operations during an illustrative downlink 310 and during an illustrative uplink 350, in accordance with at least one embodiment described herein. As depicted in FIG. 3, in embodiments, during the downlink 310, data from the upper layer or medium access control (MAC) block 312 is provided as a transport block (TrBlk) 314 that is segmented into code blocks 316 that are subsequently presented to the accelerator system 200. The accelerator system 200 performs one or more operations associated with on the code blocks 316. As depicted in FIG. 3, the output from the accelerator system 200 is returned to the cloud-based host system 302 for subsequent scrambling and modulation 320, layer mapping and precoding 322, and resource element mapping 324 prior to the cloud-based host system communicating the signal to the transmitter 326.

As depicted in FIG. 3, in embodiments, during the uplink 350 of input data from the receiver to the cloud-based host system 302, the cloud-based host system 302 selects resource elements 354 and performs layer de-mapping and demodulation 356 prior to passing the input data to the accelerator system 200. An accelerator circuit 150 within the accelerator system 200, performs a maximum likelihood detection (MLD) 358 and returns the results as output data to the cloud-based host system 302. The cloud-based host system 302 performs a hybrid automatic repeat request (HARM) 360 and again passes input data to the accelerator system 200 where an accelerator circuit performs one or more operations associated with forward error correction on the upload signal. The output data from accelerator circuit 150 in the accelerator system 200 passes to the cloud-based host system 302. The transport blocks (TrBlk) 362 associated with the upload signal are passed to a medium access control block 364 and forwarded to an upper layer of the cloud-based host system 302.

Figure 4:
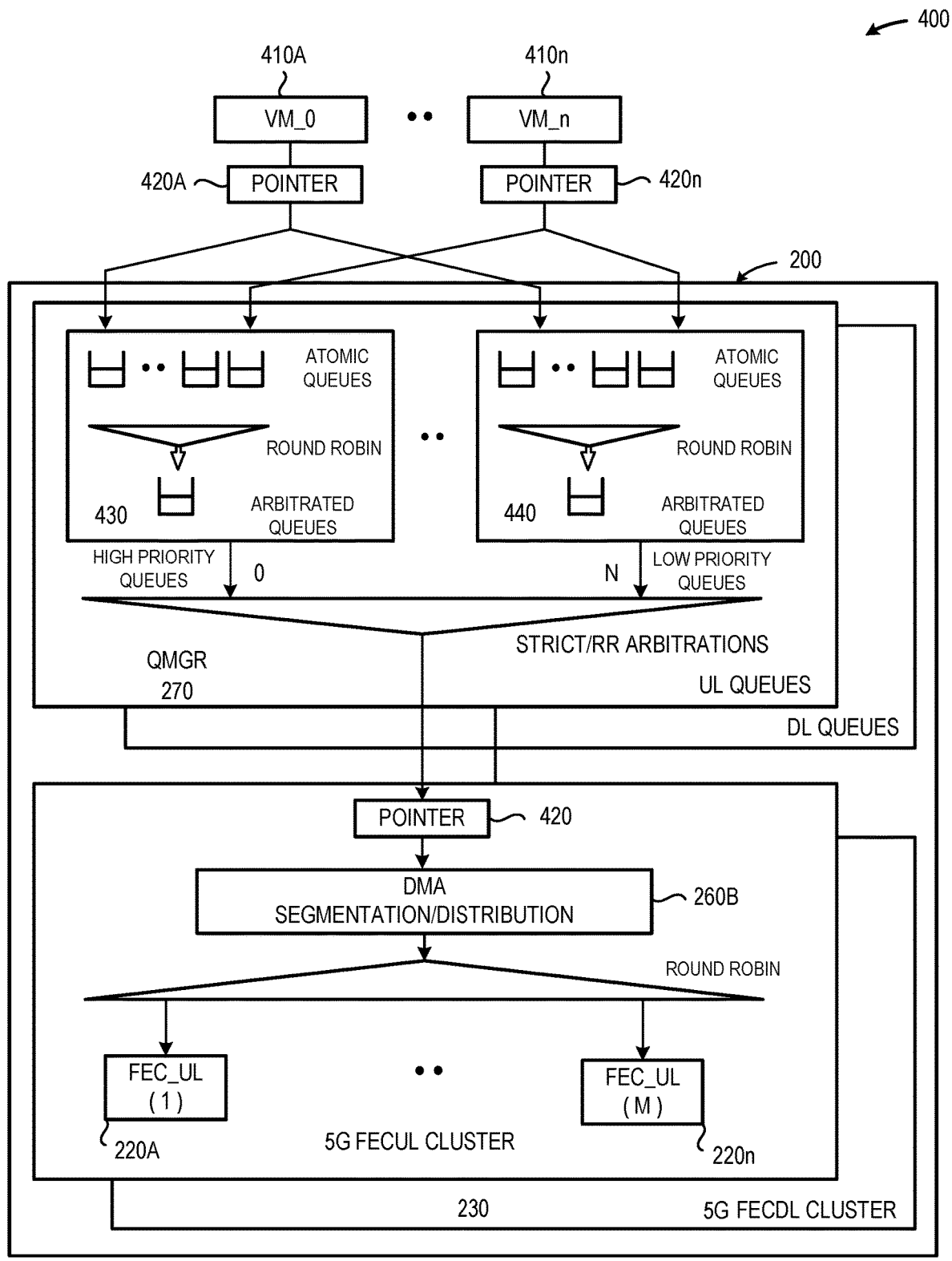
FIG. 4 is a flow diagram of an illustrative accelerator system that incorporates a plurality of Direct Memory Access (DMA) circuits to perform various computationally intensive operations associated with forward error correction of 5G radio access network signals from each of a plurality of virtual machines executing by respective processor circuits, in accordance with at least one embodiment described herein.

FIG. 4 is a flow diagram of an illustrative cloud-based system 400 that incorporates the accelerator system 200 to perform various computationally intensive operations associated with forward error correction of 5G radio access network signals from each of a plurality of virtual machines 410A-410n executing by respective processor circuits 160A-160n, in accordance with at least one embodiment described herein. As depicted in FIG. 4, the virtual machine 410 executed by processor circuitry 160 passes data representative of a pointer 420 to the accelerator system 200. The pointer 420 includes data representative of an address in system memory circuitry 170 that includes a DMA descriptor that causes a DMA 260 associated with a particular accelerator circuit 150 to retrieve input data and perform one or more operations on the input data. In embodiments, in addition to the data representative of the pointer 420, the processor circuit 160 also communicates data representative of a priority level (e.g., high priority/low priority) to the accelerator system 200.

As depicted in FIG. 4, the pointer 420 and priority data is communicated to the queue management circuit 270 via the interface circuitry 120 in the accelerator system 200. In addition, the accelerator system 200 may communicate interrupt (IRQ) or polling data associated with the queue management circuit 270 to the processor circuit 160 via the interface circuitry 120.

Within the queue management circuit 270 the received pointers 420A-420n may be allocated to either a high priority queue 430 or a low priority queue 440 based, at least in part, on the priority information communicated by the processor circuit 160 along with the pointer 420A-420n. The queue management circuit 270 supports both the high priority queue 430 and the low priority queue 440. In embodiments, the queue management circuit 270 performs arbitration between each of a plurality of quality of service (QoS) queue circuits using round-robin or weighted round-robin arbitration. In embodiments, the queue management circuit 270 generates an interrupt if one of the plurality of queues is exhausted. In embodiments, the queue management circuit 270 may communicate information indicative of the status of some or all of the plurality of queues 430, 440 in response to a request from a processor circuit 160 that is received by the queue management circuit 270.

The DMA circuitry 260B receives the pointer 420 from the queue 430, 440. The DMA circuitry 260B reads the frame descriptor, and retrieves the input data from either the system memory circuitry 170 or the accelerator system memory circuitry 140. The DMA circuitry 260B then passes the input data to an accelerator circuit 220A-220n. The DMA circuitry 260B assigns the input data to any accelerator circuit 220A-220n included in the respective 5G Upload Accelerator cluster. In embodiments, the DMA circuitry 260B assigns the input data to the accelerator circuits 220 on a round-robin basis. The accelerator circuit 220A-220n generates output data that is collected by the DMA circuitry 260B. Based on the information contained in the frame descriptor, the DMA circuitry 260B then writes the output data to a defined location in either the system memory circuitry 170 or the accelerator system memory circuitry 140. After transferring the accelerator circuit output data to system memory circuitry 170 and/or accelerator system memory circuitry 140, the DMA circuitry 260B generates an interrupt (IRQ). Although the above description was specific to a 5G Uplink FEC, those of skill in the relevant arts will readily appreciate the above description is equally applicable to any DMA circuitry and any accelerator circuitry.

Figure 5:
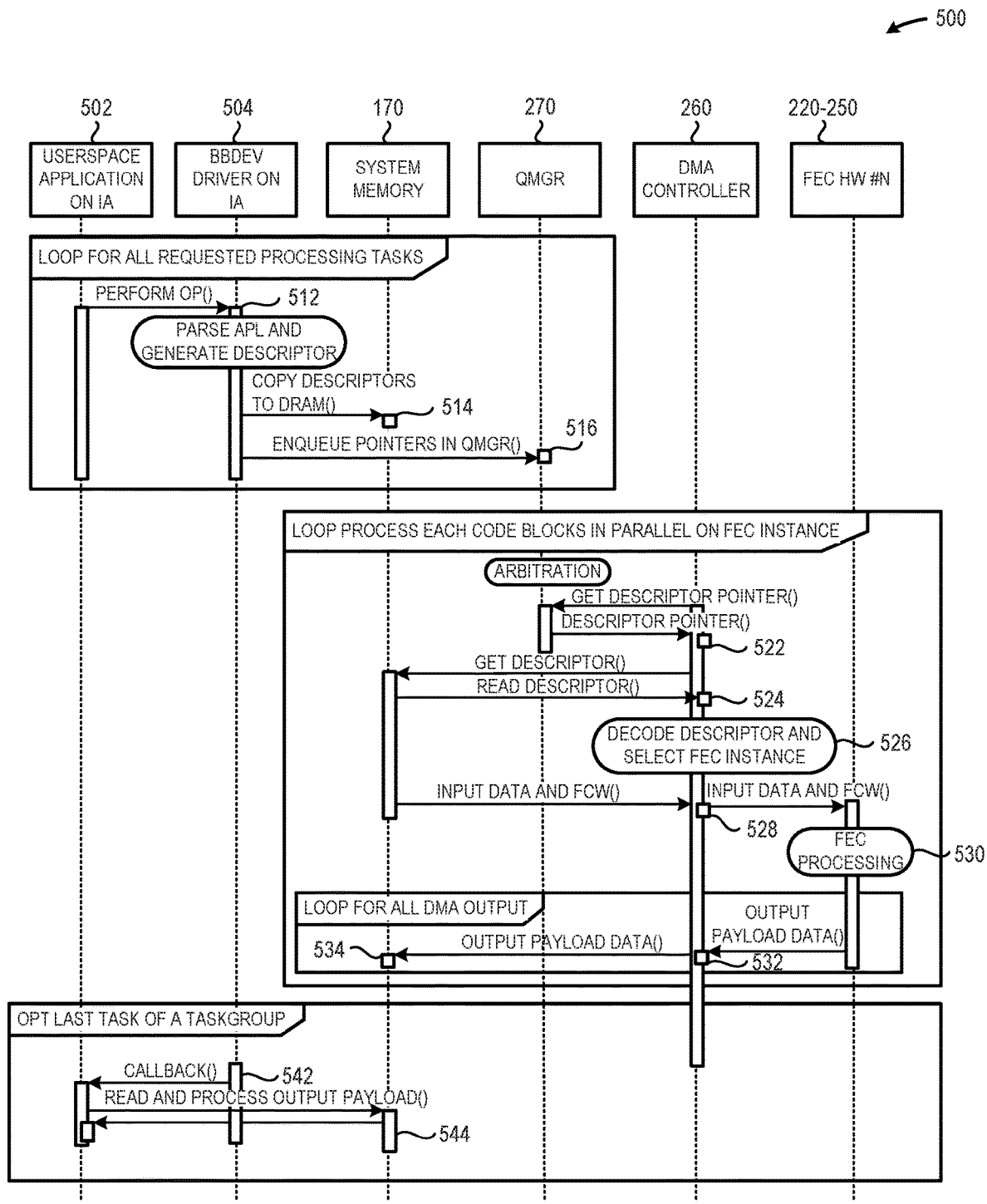
FIG. 5 is a high-level flow diagram of an illustrative accelerator method, in accordance with at least one embodiment described herein.

FIG. 5 is a high-level flow diagram of an illustrative scalable acceleration method 500, in accordance with at least one embodiment described herein. As depicted in FIG. 5, a system processor circuit executes a user application 502 and an interface application 504. The interface application 504 facilitates the interaction between the system processor circuit and the accelerator system 200.

At 512 the user application 502 causes the interface application 504 to generate a descriptor. After generating the descriptor, at 514, the interface application 504 copies the descriptor to an address and/or location in the system memory circuitry 170. At 516, the interface application 504 enqueues data representative of a pointer 420 that includes information indicative of the address and/or location in system memory of the descriptor, in the queue management circuit 270. In embodiments, based at least in part on the priority level assigned to the pointer 420, the queue management circuit 270 may enqueue the pointer 420 in either a high priority queue circuit 430 or a low priority queue circuit 440.

At 522, DMA circuitry 260 receives the pointer 420 from the queue management circuit 270. At 524, using the data includes in the pointer 420, the DMA circuitry 260 retrieves the descriptor stored in the system memory circuitry 170. At 526, the DMA circuitry 260 decodes the descriptor and selects an accelerator circuit 220 to perform one or more operations on the input data. At 528, the DMA circuitry 260 retrieves the input data from system memory circuitry 170 and transfers the input data to the accelerator circuit 220. At 530, the accelerator circuit 220 performs one or more operations on the received input data to generate output data. At 532, the accelerator circuit 220 transfers the output data to the DMA circuitry 260. Upon receipt of the output data, at 534, the DMA circuitry 260 transfers the output data to system memory circuitry 170.

At 542, the interface application 504 notifies the user application 504 that output data has been stored in system memory circuitry 170. At 544, the user application 502 retrieves the output data from the system memory circuitry 170.

Figure 6:
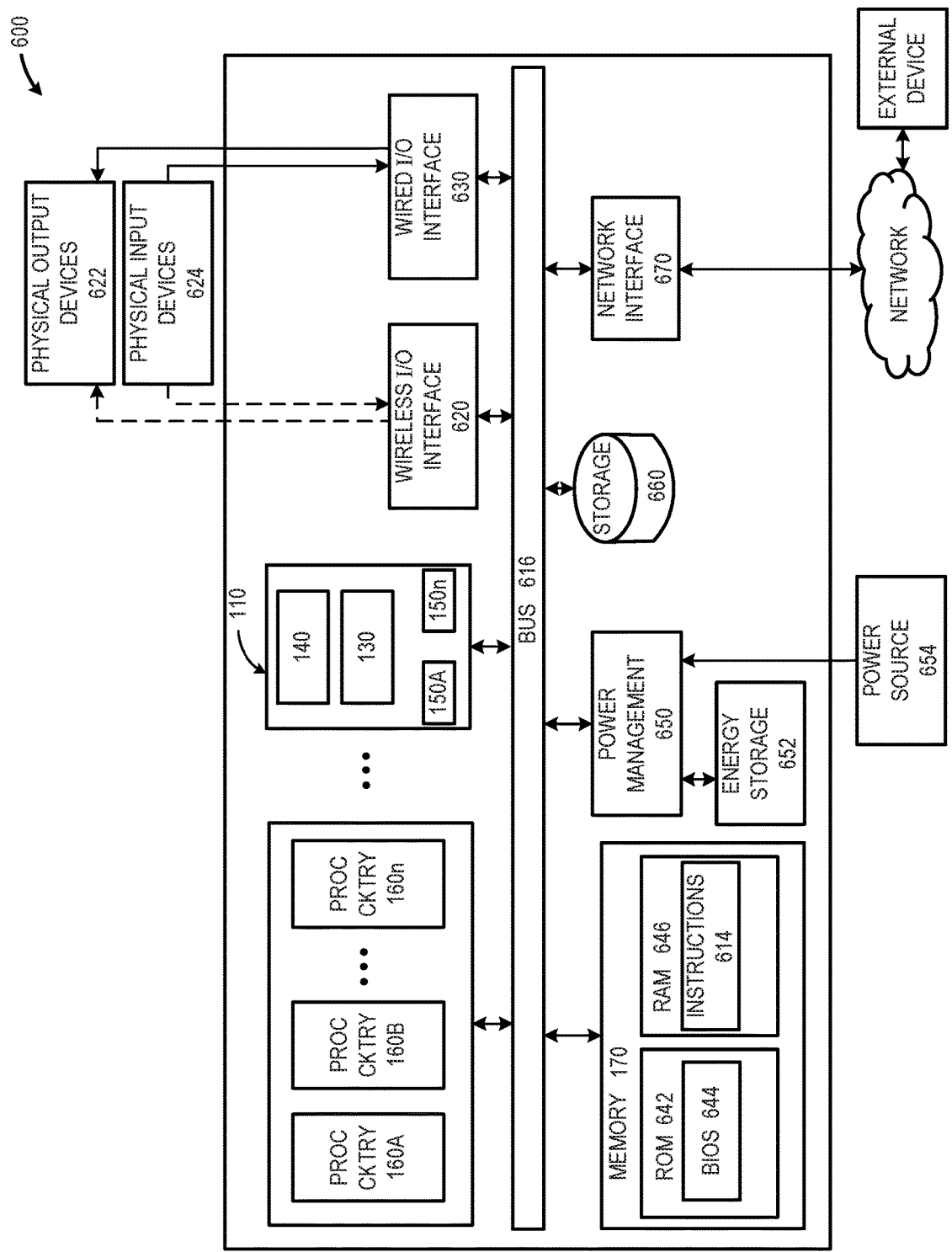
FIG. 6 is a schematic diagram of an illustrative electronic, processor-based, device that includes a plurality of processor circuits and an accelerator system, in accordance with at least one embodiment described herein.

FIG. 6 is a schematic diagram of an illustrative electronic, processor-based, device 600 that includes a plurality of processor circuits 160A-160n and an accelerator system 110, in accordance with at least one embodiment described herein. In embodiments, the processor-based device 600 may include a server computer system or a component included in a server computer system, such as a blade server. The processor-based device 600 may additionally include one or more of the following: a wireless input/output (I/O) interface 620, a wired I/O interface 630, system memory circuitry 170, power management circuitry 650, a network interface 670, and a non-transitory storage device 690. The following discussion provides a brief, general description of the components forming the illustrative processor-based device 600. Example, non-limiting processor-based devices 600 may include, but are not limited to: smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuits 160 may include any number of hardwired or configurable circuits, some or all of which may include programmable and/or configurable combinations of electronic components, semiconductor devices, and/or logic elements that are disposed partially or wholly in a cloud-based server or other similar computing systems and/or devices capable of executing processor-readable instructions.

The processor-based device 600 includes a bus or similar communications link 616 that communicably couples and facilitates the exchange of information and/or data between various system components including the processor circuits 160, the one or more wireless I/O interfaces 620, the one or more wired I/O interfaces 630, the system memory 640, the one or more network interfaces 670, and/or the one or more storage devices 690. The processor-based device 600 may be referred to in the singular herein, but this is not intended to limit the embodiments to a single processor-based device 600, since in certain embodiments, there may be more than one processor-based device 600 that incorporates, includes, or contains any number of communicably coupled, collocated, or remote networked circuits or devices.

The processor circuits 160 may include any number, type, or combination of currently available or future developed devices capable of executing machine-readable instruction sets. The processor circuits 160 may include individual single- or multi-thread cores disposed in one or more CPUs. The processor circuits 160 may include but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the processor-based device 600 may employ any currently available or future developed serial or parallel bus structures or architectures.

The system memory circuitry 170 may include read-only memory ("ROM") 642 and random access memory ("RAM") 646. A portion of the ROM 642 may be used to store or otherwise retain a basic input/output system ("BIOS") 644. In embodiments, at least some of the one or more machine-readable instruction sets 614 cause at least a portion of the processor circuits 160 to provide, create, produce, transition, and/or function as a dedicated, specific, and particular machine, for example a word processing machine, a digital image acquisition machine, a media playing machine, a gaming system, a communications device, a smartphone, or similar.

The processor-based device 600 may include at least one wireless input/output (I/O) interface 620. In embodiments, the wireless I/O interface 620 may include: one or more backhaul interfaces that link a wireless network to a central exchange; one or more fronthaul interfaces that link centralized baseband controllers to remote radio heads at cell sites; and/or one or more midhaul interfaces that link the controller or radio head to the next wireless network. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The processor-based device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The processor-based device 600 may include one or more communicably coupled, non-transitory, data storage devices 660. The data storage devices 660 may include one or more hard disk drives (HDDs) and/or one or more solid-state storage devices (SSDs). The data storage devices 660 may be disposed local to the processor circuits 160 or may be disposed remote from the processor circuits 160, for example the processor circuits 160 may be disposed on a first rack-mount blade server and the storage devices 660 may be disposed on a second rack-mount blade installed in the same or a different rack. The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the processor-based device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor circuits 160 and/or one or more applications executed on or by the processor circuits 160. In some instances, one or more data storage devices 660 may be communicably coupled to the processor circuits 160, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or WiFi®, etc.).

Processor-readable instruction sets 614 and other programs, applications, logic sets, and/or modules may be stored in whole or in part in the system memory circuitry 170. Such instruction sets 614 may be transferred, in whole or in part, from the one or more data storage devices 660. The instruction sets 614 may be loaded, stored, or otherwise retained in system memory circuitry 170, in whole or in part, during execution by the processor circuits 160.

The processor-based device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the processor-based device 600. The power source 654 may include, but is not limited to, a solar power system, a commercial electric grid, a portable generator, an external energy storage device, or any combination thereof.

For convenience, the processor circuits 160, the wireless I/O interface 620, the wired I/O interface 630, the system memory 640, the power management circuitry 650, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor circuits 160. In some embodiments, all or a portion of the bus 616 may be omitted and the components are coupled directly to each other using suitable wired or wireless connections.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
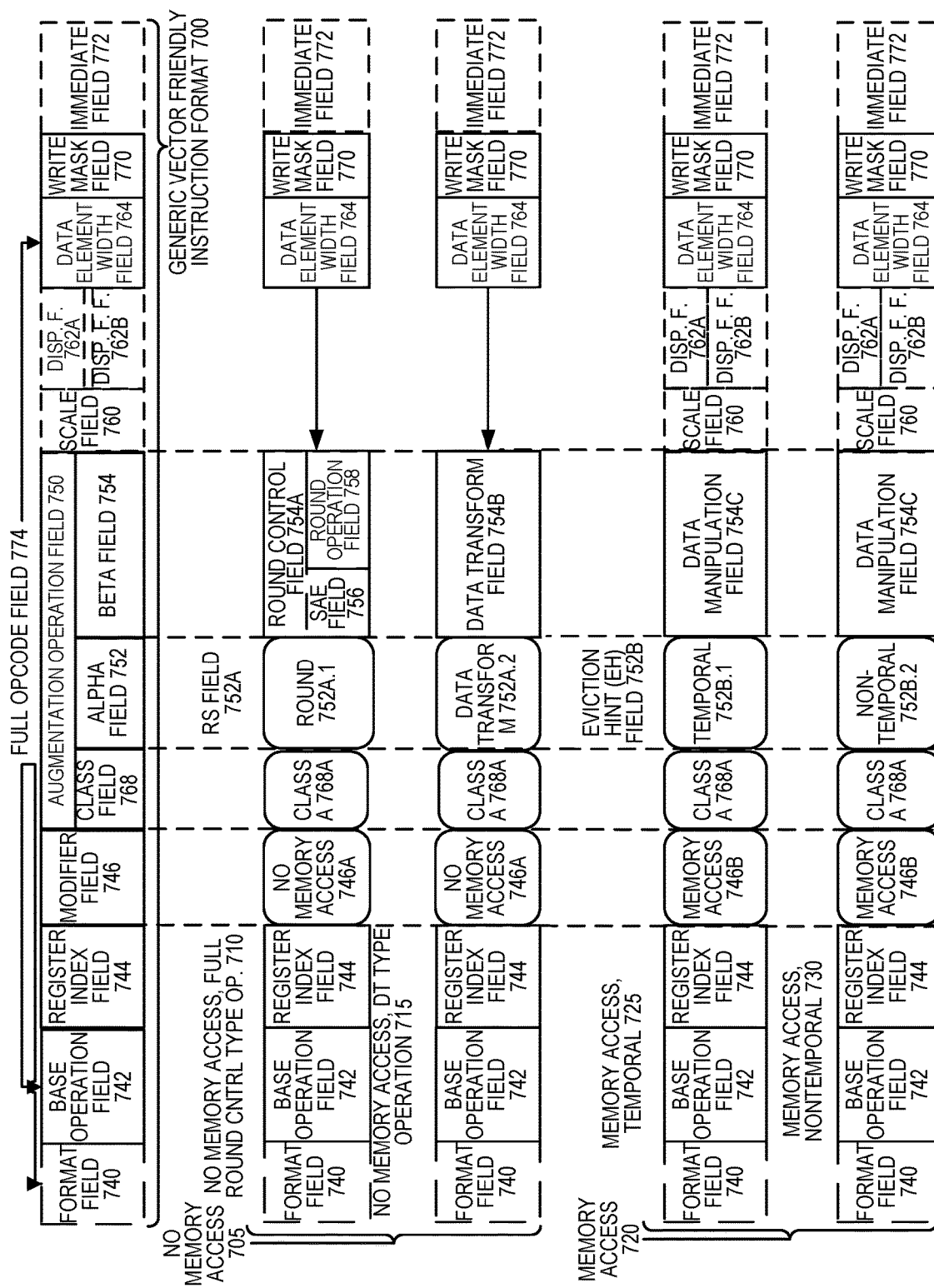
FIG. 7A and FIG. 7B are block diagrams illustrating a generic vector friendly instruction format and instruction templates thereof according to embodiments of the invention.
Figure 7B:
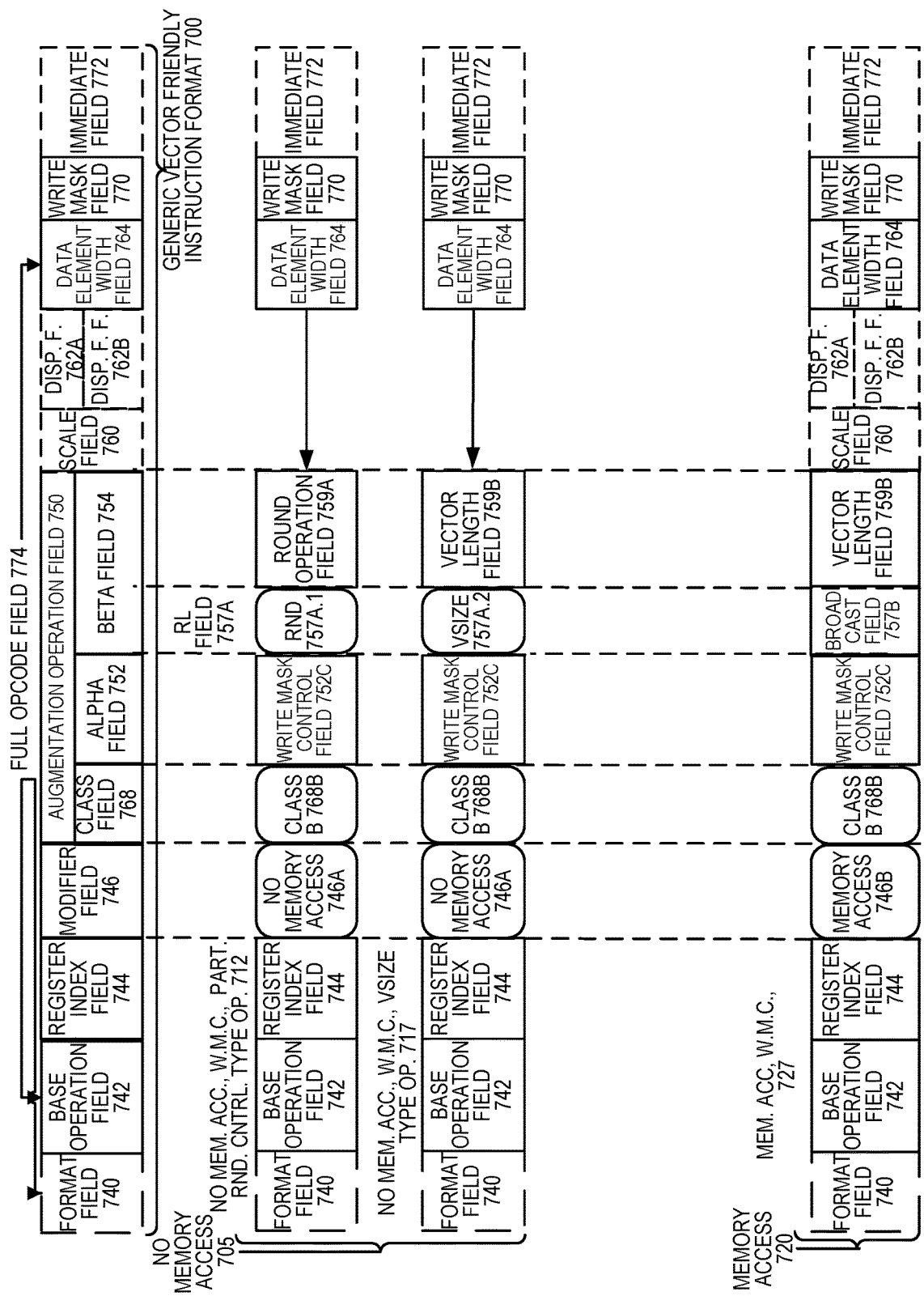

FIGS. 7A-7B are block diagrams illustrating a generic vector friendly instruction format and instruction templates thereof according to embodiments of the invention. FIG. 7A is a block diagram illustrating a generic vector friendly instruction format and class A instruction templates thereof according to embodiments of the invention; while FIG. 7B is a block diagram illustrating the generic vector friendly instruction format and class B instruction templates thereof according to embodiments of the invention. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access (746B) from those that do not (746A); that is, between no memory access 705 instruction templates and memory access 720 instruction templates. Memory access operations 746B read and/or write to the memory hierarchy (in some cases specifying the source and/or destination addresses using values in registers), while non-memory access operations 746A do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the invention, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}$*index+base).

Displacement Field 762A—its content is used as part of memory address generation (e.g., for address generation that uses $2^{scale}$*index+base+displacement).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the invention are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the invention the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the invention where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the invention where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8 is a block diagram illustrating an exemplary specific vector friendly instruction format according to embodiments of the invention. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although embodiments of the invention are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the invention).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]-R), EVEX.X bit field (EVEX byte 1, bit [6]-X), and 757 BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810 this is the first part of the REX' field 810 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm)—its content encodes an implied leading opcode byte (0F, 0F 38, or 0F 3).

Data element width field 764 (EVEX byte 2, bit [7]-W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]-U)—If EVEX.U=0, it indicates class A or EVEX.U0; if EVEX.0=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to one embodiment of the invention. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the invention. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
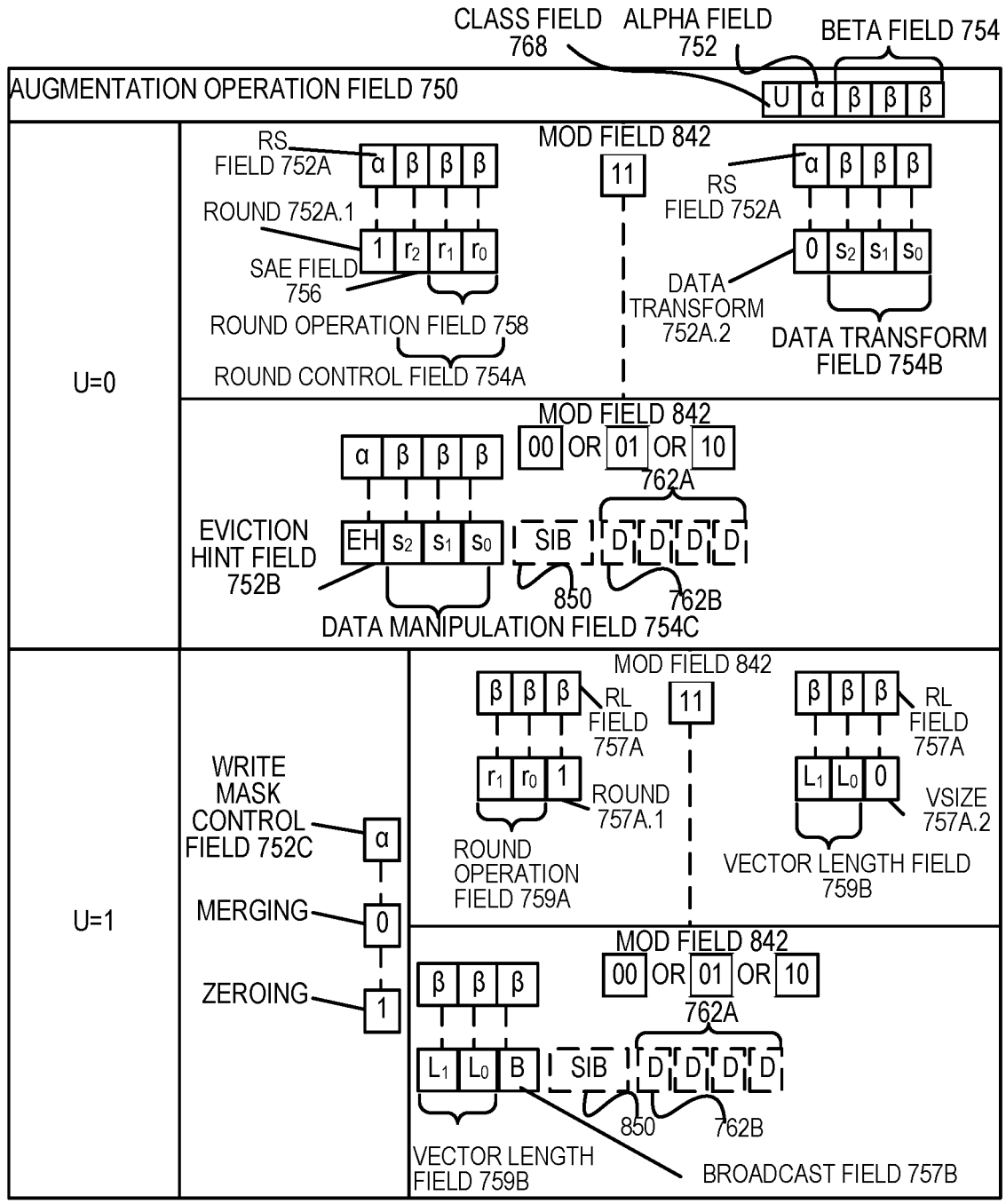

FIG. 8D is a block diagram illustrating the fields of the specific vector friendly instruction format 800 that make up the augmentation operation field 750 according to one embodiment of the invention. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4]-SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]-SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4]-SSS) is interpreted as a three bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4]-$S_0$) is interpreted as the RL field 757A; when it contains a 1 (round 757A.1) the rest of the beta field 754 (EVEX byte 3, bit [6-5]-$S_{2-1}$) is interpreted as the round operation field 759A, while when the RL field 757A contains a 0 (VSIZE 757.A2) the rest of the beta field 754 (EVEX byte 3, bit [6-5]-$S_{2-1}$) is interpreted as the vector length field 759B (EVEX byte 3, bit [6-5]-$L_{1-0}$). When U=1 and the MOD field 842 contains 00, 01, or 10 (signifying a memory access operation), the beta field 754 (EVEX byte 3, bits [6:4]-SSS) is interpreted as the vector length field 759B (EVEX byte 3, bit [6-5]-$L_{1-0}$) and the broadcast field 757B (EVEX byte 3, bit [4]-B).

Exemplary Register Architecture

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
|  | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
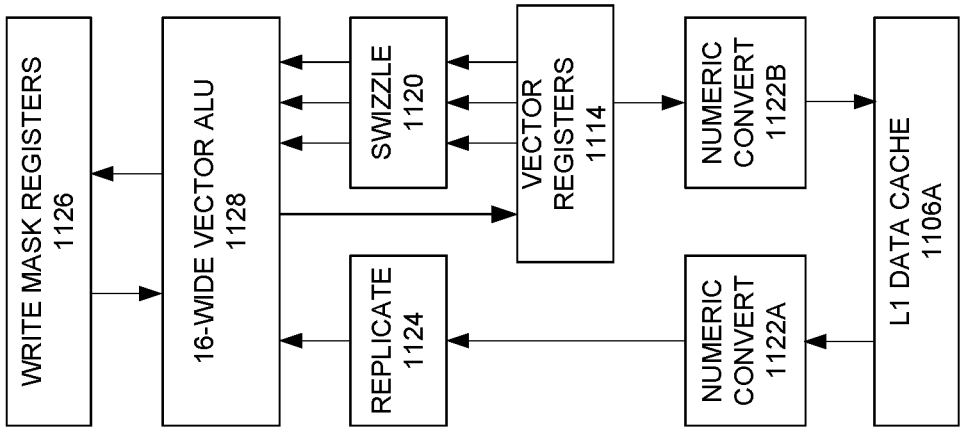
FIG. 11A and FIG. 11B illustrate a block diagram of a more specific exemplary in-order core architecture, which core would be one of several logic blocks (including other cores of the same type and/or different types) in a chip.
Figure 11A:
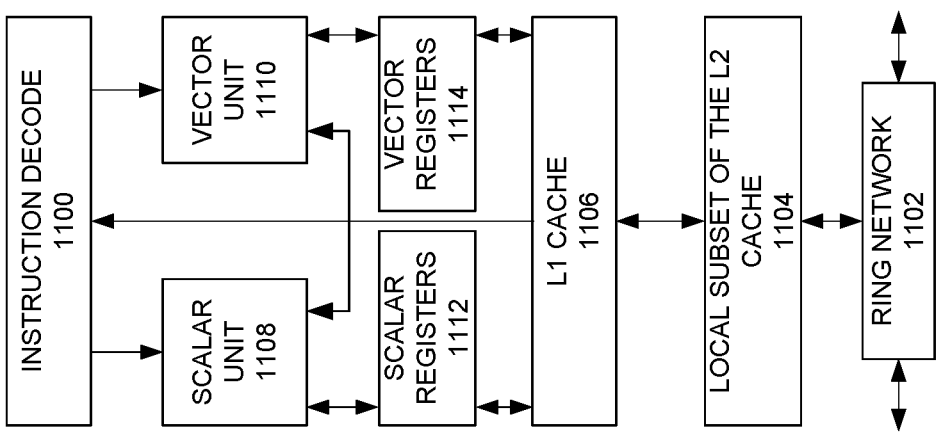

FIGS. 11A and 11B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention.

FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
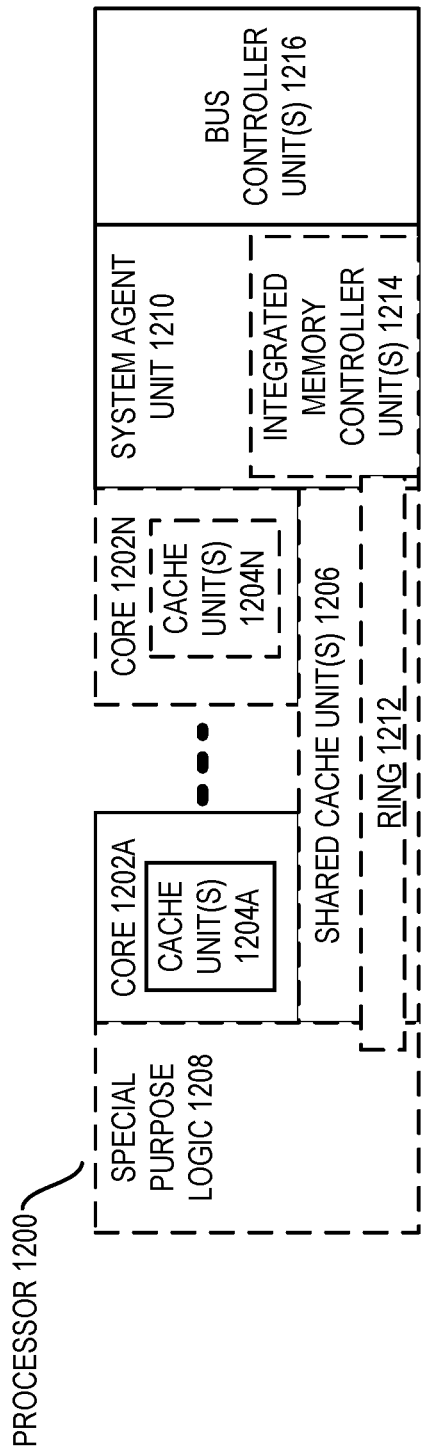
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13, 14, 15, and 16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
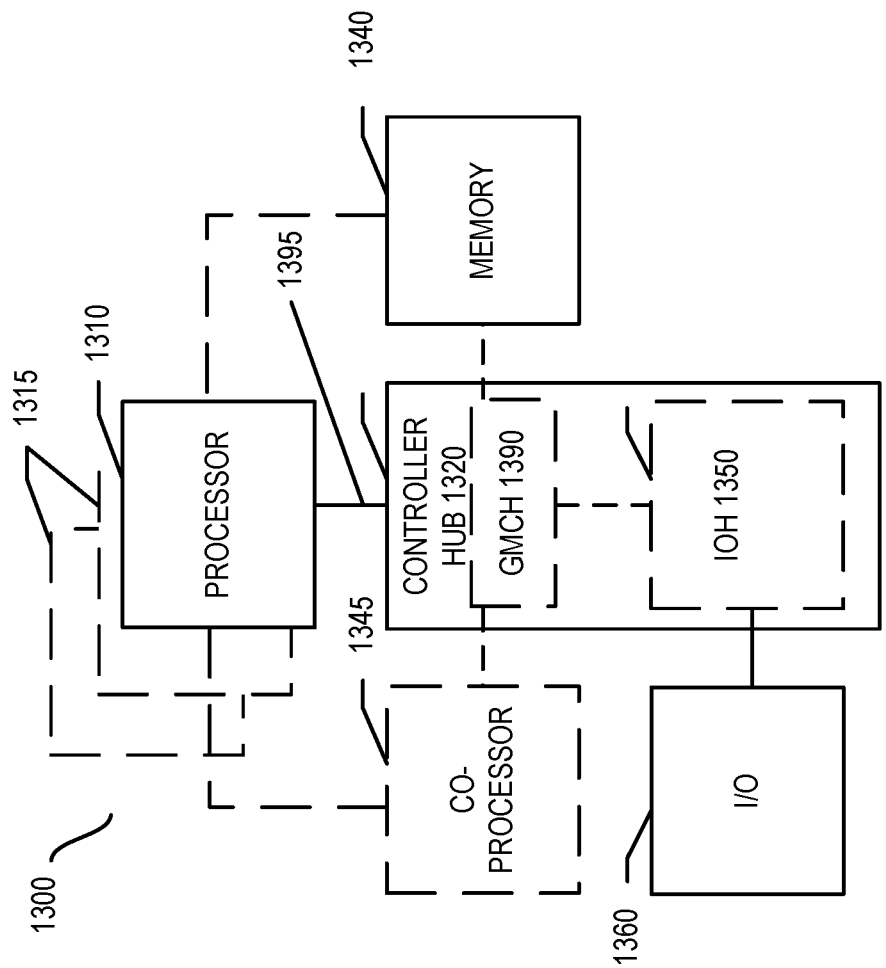
FIG. 13, FIG. 14, FIG. 15, and FIG. 16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
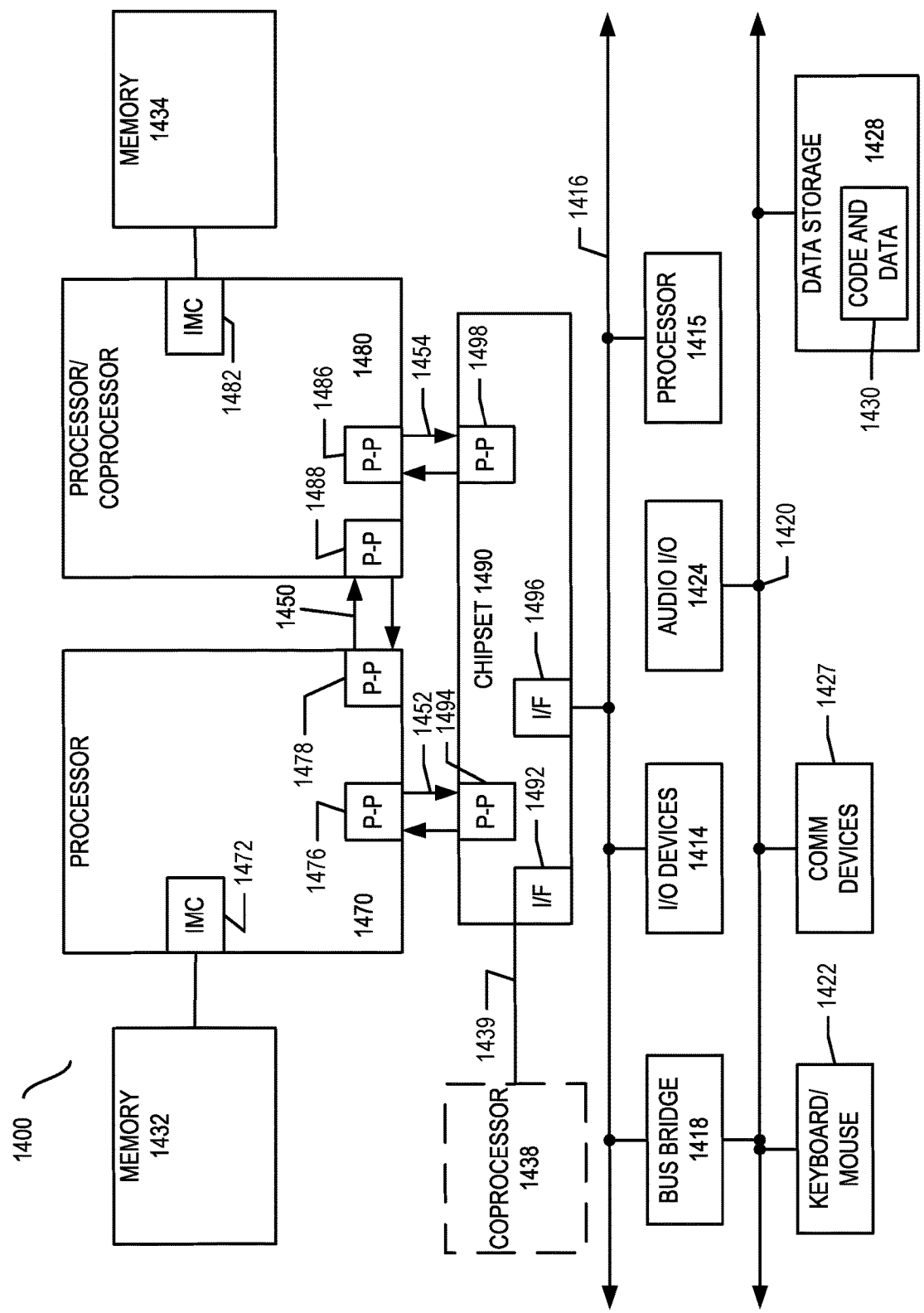

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information 1439 with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
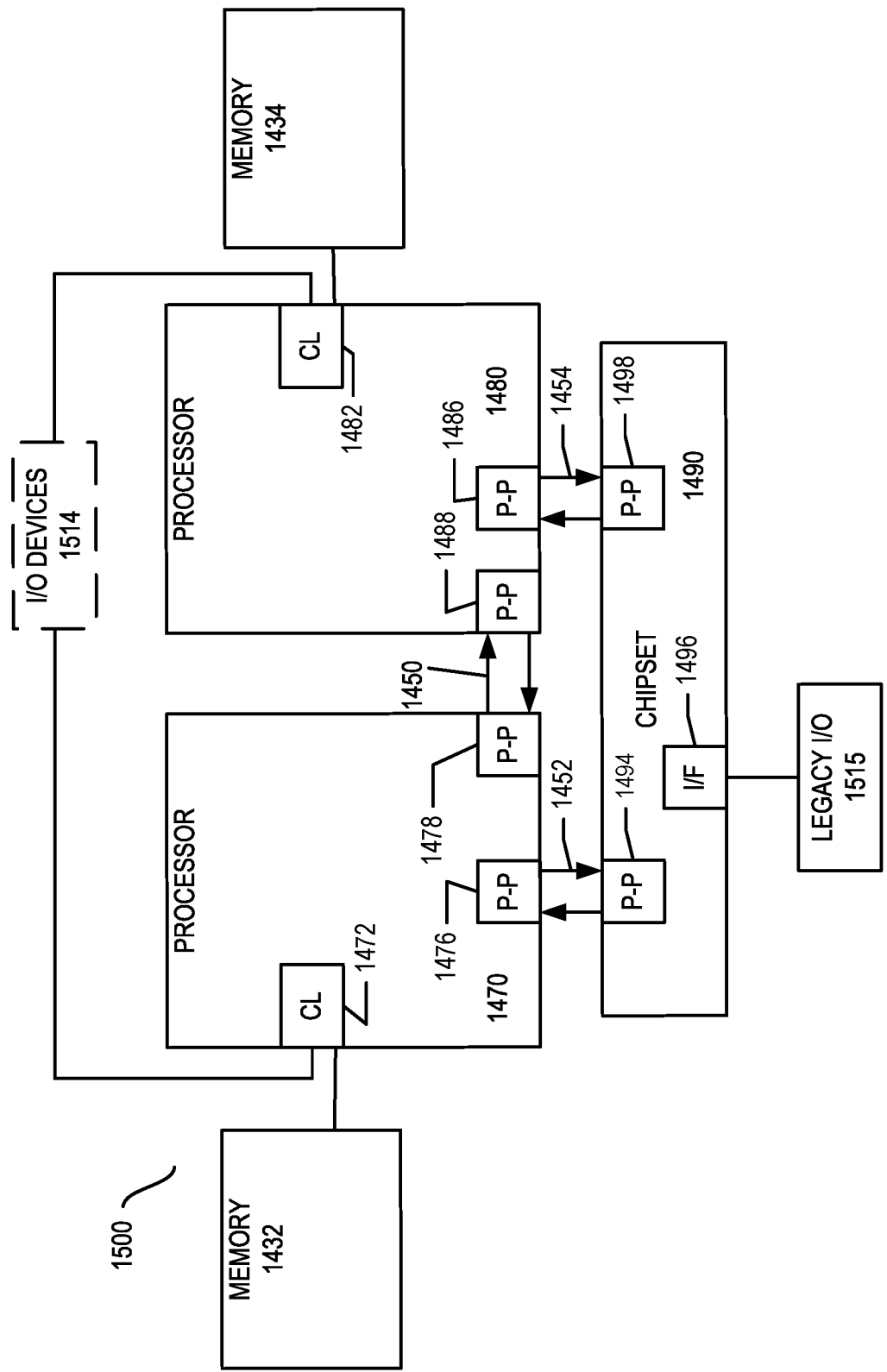

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
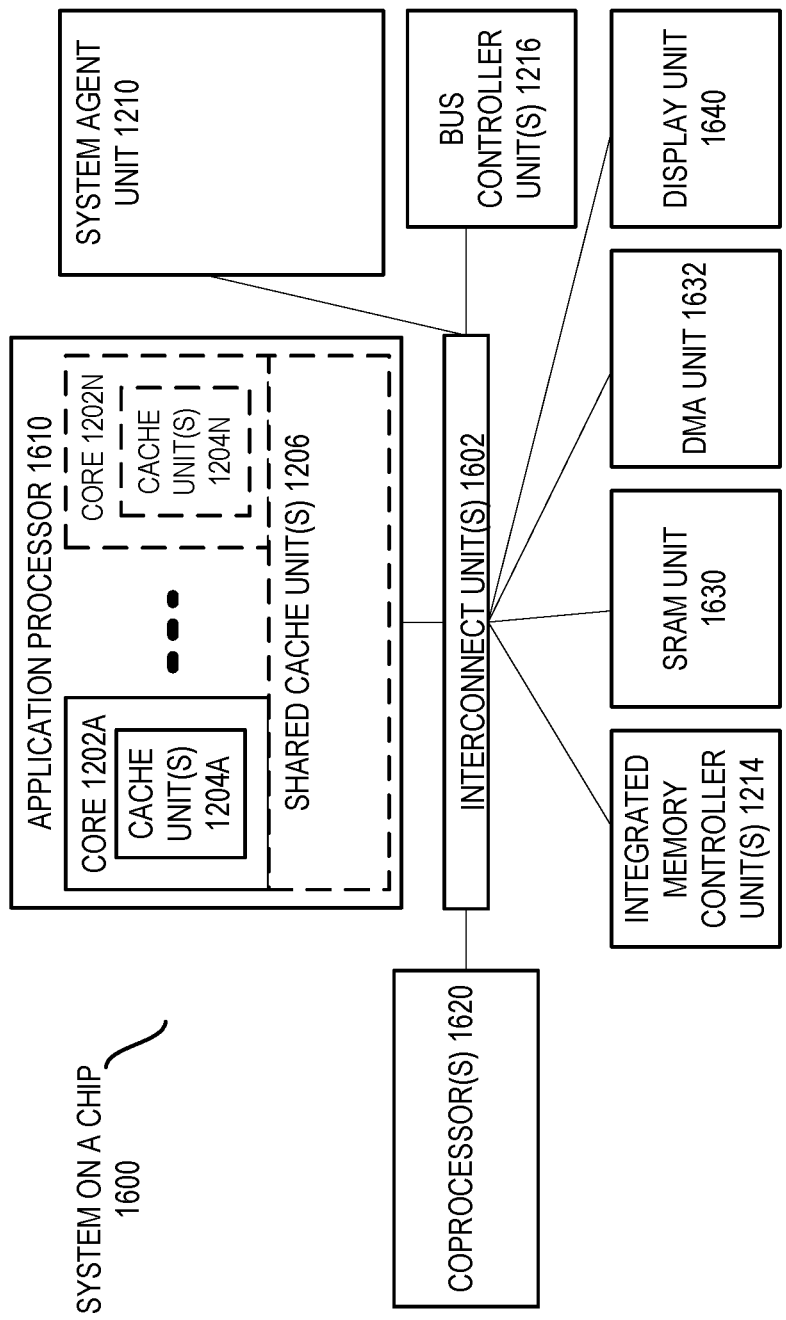

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1204A-1204N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
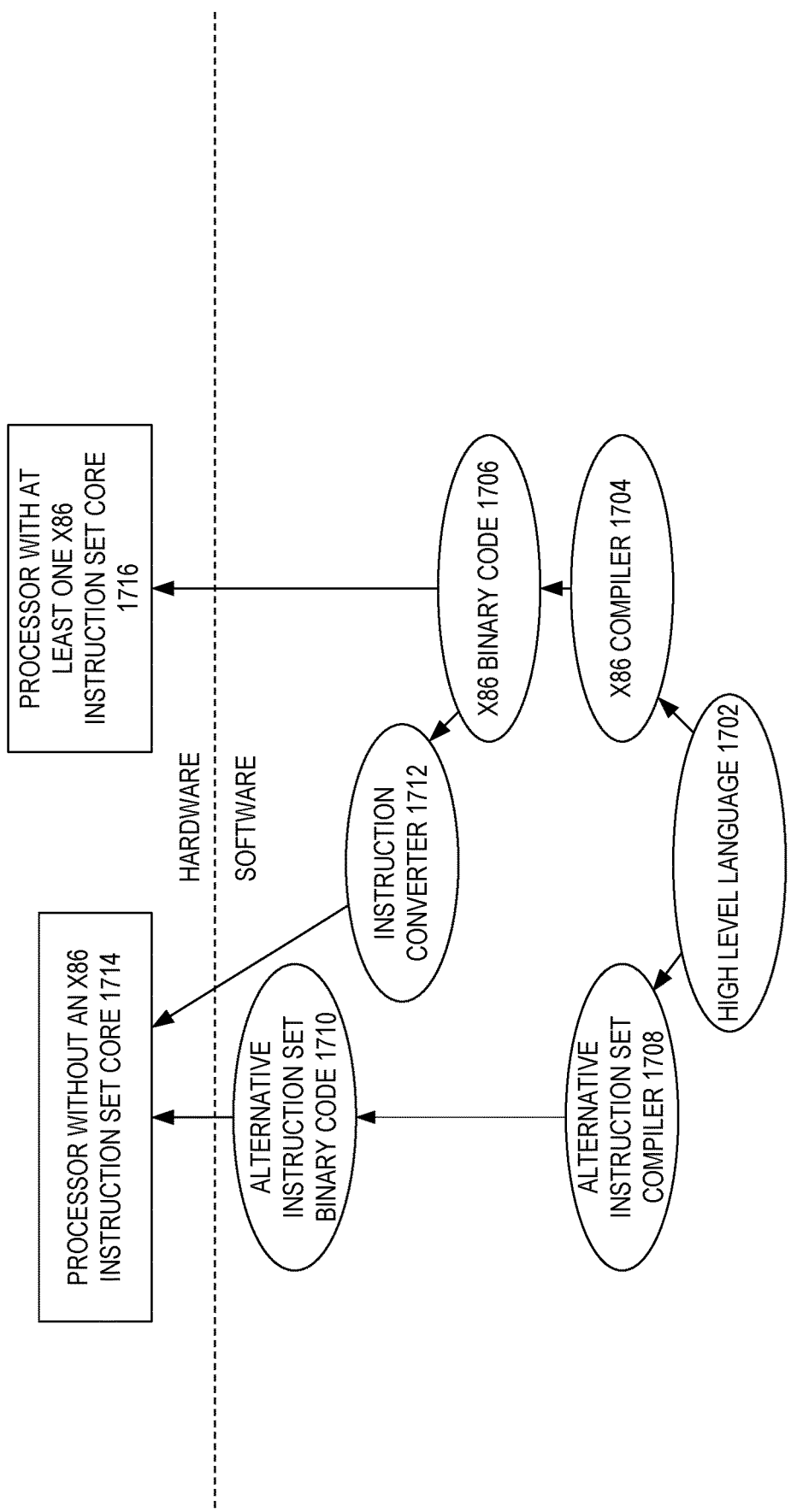
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

While FIG. 5 illustrates various operations according to one or more embodiments, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to accelerator circuitry useful in a cloud-based radio access network (C-RAN). The C-RAN includes interface circuitry that couples the C-RAN accelerator circuitry to each of a plurality of processor circuits and to system memory circuitry. The C-RAN also includes queue management circuitry, local storage circuitry, direct memory access (DMA) circuitry, and a plurality of accelerator circuits. In operation, the processor circuit communicates a message to the queue management circuitry. The message includes pointer data and priority data. The queue management circuitry enqueues the message in one of a plurality of queues. The DMA circuitry receives the message and locates a descriptor at the address designed by the pointer. The DMA circuitry retrieves input data, selects an accelerator circuit, and provides the input data to the selected accelerator circuit. The accelerator circuit returns output data to the DMA circuitry, The output data is stored in system memory circuitry.

The following examples pertain to further embodiments. The following examples of the present disclosure may comprise subject material such as at least one device, a method, at least one machine-readable medium for providing a cloud-based radio access network (C-RAN) accelerator circuitry useful for performing operations associated with 5G maximum likelihood detection operations, 5G uplink forward error correction (UL FEC) operations, 5G downlink forward error correction (DL FEC) operations, 4G uplink forward error correction (UL FEC) operations, and/or 4G downlink forward error correction (DL FEC) operations.

According to example 1, there is provided an accelerator system. The accelerator system may include: queue manager circuitry to: receive a request that includes information indicative of a priority and data representative of a pointer to a first location in system memory circuitry; and enqueue the pointer to one of a plurality of queue circuits: a plurality of accelerator circuits; direct memory access (DMA) circuitry coupled to the plurality of accelerator circuits, the DMA circuitry to: receive the pointer from the queue manager circuitry; read data at the first location in the system memory circuitry; fetch input data from a second location in the system memory circuitry; select one of the plurality of accelerator circuits; provide the input data to the selected one of the plurality of accelerator circuits; receive output data from the selected one of the plurality of accelerator circuits; and transfer the output data to a third memory location in the system memory circuitry.

Example 2 may include elements of example 1 where the DMA circuitry further: generates a notification in response to the transfer of the output data to the third location in the system memory.

Example 3 may include elements of examples 1 or 2 where the plurality of accelerator circuits comprises a plurality of 5G maximum likelihood detection (MLD) accelerator circuits.

Example 4 may include elements of any of examples 1 through 3 where the plurality of accelerator circuits comprises at least one of: a plurality of 4G uplink forward error correction (UL FEC) accelerator circuits or a plurality of 5G UL FEC accelerator circuits.

Example 5 may include elements of any of examples 1 through 4 where the plurality of accelerator circuits comprises at least one of: a plurality of 4G downlink forward error correction (DL FEC) accelerator circuits or a plurality of 5G DL FEC accelerator circuits.

Example 6 may include elements of any of examples 1 through 5 and the queue manager circuitry to further: receive the request from a communicably coupled processor circuit.

Example 7 may include elements of any of examples 1 through 6 and the queue manager circuitry to further receive the request from a communicably coupled virtual machine.

Example 8 may include elements of any of examples 1 through 7 and the DMA circuitry to further read data representative of a descriptor at the first location in the system memory circuitry.

According to example 9, there is provided a server system. The system may include: a plurality of processor circuits; system memory circuitry; and an accelerator system that includes: queue manager circuitry to: receive a request that includes information indicative of a priority and data representative of a pointer to a first location in system memory circuitry; and enqueue the pointer to one of a plurality of queue circuits. The system may further include: a plurality of accelerator circuits; direct memory access (DMA) circuitry coupled to the plurality of accelerator circuits, the DMA circuitry to: receive the pointer from the queue manager circuitry; read data at the first location in the system memory circuitry; fetch input data from a second location in the system memory circuitry; select one of the plurality of accelerator circuits; provide the input data to the selected one of the plurality of accelerator circuits; receive output data from the selected one of the plurality of accelerator circuits; and transfer the output data to a third memory location in the system memory circuitry.

Example 10 may include elements of example 9 where second location in the system memory circuitry and third location in the system memory circuitry are the same memory location in the system memory circuitry.

Example 11 may include elements of any of examples 9 or 10 and the DMA circuitry may further: generate a notification in response to the transfer of the output data to the third location in the system memory.

Example 12 may include elements of any of examples 9 through 11 where the plurality of accelerator circuits comprises a plurality of 5G maximum likelihood detection (MLD) accelerator circuits.

Example 13 may include elements of any of examples 9 through 12 where the plurality of accelerator circuits comprises at least one of: a plurality of 4G uplink forward error correction (UL FEC) accelerator circuits or a plurality of 5G UL FEC accelerator circuits.

Example 14 may include elements of any of examples 9 through 13 where the plurality of accelerator circuits comprises at least one of: a plurality of 4G downlink forward error correction (DL FEC) accelerator circuits or a plurality of 5G DL FEC accelerator circuits.

Example 15 may include elements of any of examples 9 through 14 and the queue manager circuitry may further receive the request from a communicably coupled processor circuit.

Example 16 may include elements of any of examples 9 through 15 and the queue manager circuitry to further receive the request from a communicably coupled virtual machine.

Example 17 may include elements of any of examples 9 through 16 and the DMA circuitry may further read data representative of a descriptor at the first location in the system memory circuitry.

According to example 18, there is provided an acceleration method. The method may include: receiving, by queue management circuitry, a request that includes information indicative of a priority and data representative of a pointer to a first location in system memory circuitry; enqueuing, by the queue management circuitry, the pointer to one of a plurality of queue circuits; receiving, by direct memory access (DMA) circuitry, the pointer from the queue manager circuitry; reading, by the DMA circuitry, data at the first location in the system memory circuitry; fetching, by the DMA circuitry, input data from a second location in the system memory circuitry; selecting, by the DMA circuitry, one of a plurality of communicably coupled accelerator circuits; providing, by the DMA circuitry, the input data to the selected one of the plurality of accelerator circuits; receiving, by the DMA circuitry, output data from the selected one of the plurality of accelerator circuits; and transferring, by the DMA circuitry, the output data to a third memory location in the system memory circuitry.

Example 19 may include elements of example 18, and the method may further include generating, by the DMA circuitry, a notification in response to the transfer of the output data to the third location in the system memory.

Example 20 may include elements of any of examples 18 or 19 where selecting one of a plurality of communicably coupled accelerator circuits may include: selecting, by the DMA circuitry, one of a plurality of communicably coupled 5G maximum likelihood detection (MLD) accelerator circuits.

Example 21 may include elements of any of examples 18 through 29 where selecting one of a plurality of communicably coupled accelerator circuits may include: selecting, by the DMA circuitry, at least one of: a plurality of 4G uplink forward error correction (UL FEC) accelerator circuits or a plurality of 5G UL FEC accelerator circuits.

Example 22 may include elements of any of examples 18 through 21 where selecting one of a plurality of communicably coupled accelerator circuits may include: selecting, by the DMA circuitry, at least one of: a plurality of 4G downlink forward error correction (DL FEC) accelerator circuits or a plurality of 5G DL FEC accelerator circuits.

Example 23 may include elements of any of examples 18 through 22 where receiving a request that includes information indicative of a priority and data representative of a pointer to a first location in system memory circuitry may include: receiving, by queue management circuitry, a request from a communicably coupled processor circuit, the request including information indicative of a priority and data representative of a pointer to a first location in system memory circuitry.

Example 24 may include elements of any of examples 18 through 23 where receiving a request that includes information indicative of a priority and data representative of a pointer to a first location in system memory circuitry may include: receiving, by queue management circuitry, a request from a communicably coupled virtual machine, the request including information indicative of a priority and data representative of a pointer to a first location in system memory circuitry.

According to example 25, there is provided an accelerator system. The system may include: means for receiving a request that includes information indicative of a priority and data representative of a pointer to a first location in system memory circuitry; means for enqueuing the pointer to one of a plurality of queue circuits; means for receiving the pointer from the queue manager circuitry; means for reading data at the first location in the system memory circuitry; means for fetching input data from a second location in the system memory circuitry; means for selecting one of a plurality of communicably coupled accelerator circuits; means for providing the input data to the selected one of the plurality of accelerator circuits; means for receiving output data from the selected one of the plurality of accelerator circuits; and means for transferring the output data to a third memory location in the system memory circuitry.

Example 26 may include elements of example 25, and the system may further include: means for generating a notification in response to the transfer of the output data to the third location in the system memory.

Example 27 may include elements examples 25 or 26 where the means for selecting one of a plurality of communicably coupled accelerator circuits may include: means for selecting one of a plurality of communicably coupled 5G maximum likelihood detection (MLD) accelerator circuits.

Example 28 may include elements of any of examples 25 through 27 where the means for selecting one of a plurality of communicably coupled accelerator circuits may include: means for selecting at least one of: a plurality of 4G uplink forward error correction (UL FEC) accelerator circuits or a plurality of 5G UL FEC accelerator circuits.

Example 29 may include elements of any of examples 25 through 28 where the means for selecting one of a plurality of communicably coupled accelerator circuits may include: means for selecting at least one of: a plurality of 4G downlink forward error correction (DL FEC) accelerator circuits or a plurality of 5G DL FEC accelerator circuits.

Example 30 may include elements of any of examples 25 through 29 where the means for receiving a request that includes information indicative of a priority and data representative of a pointer to a first location in system memory circuitry may include: means for receiving a request from a communicably coupled processor circuit, the request including information indicative of a priority and data representative of a pointer to a first location in system memory circuitry.

Example 31 may include elements of any of examples 25 through 30 where the means for receiving a request that includes information indicative of a priority and data representative of a pointer to a first location in system memory circuitry may include: means for receiving a request from a communicably coupled virtual machine, the request including information indicative of a priority and data representative of a pointer to a first location in system memory circuitry.

According to example 32, there is provided a non-transitory, machine-readable, storage device including instructions that, when executed by acceleration system circuitry, cause the acceleration system circuitry to: receive a request that includes information indicative of a priority and data representative of a pointer to a first location in system memory circuitry; enqueue the pointer to one of a plurality of queue circuits; receive the pointer from the queue manager circuitry; read data at the first location in the system memory circuitry; fetch input data from a second location in the system memory circuitry; select one of a plurality of communicably coupled accelerator circuits; provide the input data to the selected one of the plurality of accelerator circuits; receive output data from the selected one of the plurality of accelerator circuits; and transfer the output data to a third memory location in the system memory circuitry.

Example 33 may include elements of example 32 where the instructions further cause the acceleration system circuitry to: generate a notification in response to the transfer of the output data to the third location in the system memory.

Example 34 may include elements of any of examples 32 or 33 where the instructions that cause the acceleration system circuitry to select one of a plurality of communicably coupled accelerator circuits cause the acceleration system circuitry to: select one of a plurality of communicably coupled 5G maximum likelihood detection (MLD) accelerator circuits.

Example 35 may include elements of any of examples 32 through 34 where the instructions that cause the acceleration system circuitry to select one of a plurality of communicably coupled accelerator circuits cause the acceleration system circuitry to: select at least one of: a plurality of 4G uplink forward error correction (UL FEC) accelerator circuits or a plurality of 5G UL FEC accelerator circuits.

Example 36 may include elements of any of examples 32 through 35 where the instructions that cause the acceleration system circuitry to select one of a plurality of communicably coupled accelerator circuits cause the acceleration system circuitry to: select at least one of: a plurality of 4G downlink forward error correction (DL FEC) accelerator circuits or a plurality of 5G DL FEC accelerator circuits.

Example 37 may include elements of any of examples 32 through 36 where the instructions that cause the acceleration system circuitry to receive a request that includes information indicative of a priority and data representative of a pointer to a first location in system memory circuitry cause the acceleration system circuitry to: receive a request from a communicably coupled processor circuit, the request including information indicative of a priority and data representative of a pointer to a first location in system memory circuitry.

Example 38 may include elements of any of examples 32 through 37 where the instructions that cause the acceleration system circuitry to receive a request that includes information indicative of a priority and data representative of a pointer to a first location in system memory circuitry cause the acceleration system circuitry to: receive a request from a communicably coupled virtual machine, the request including information indicative of a priority and data representative of a pointer to a first location in system memory circuitry.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. An accelerator disposed remote from a plurality of processor circuits, the accelerator comprising:
   queue manager circuitry to:
      receive a request from one of a plurality of processor circuits, the request including information indicative of a priority and data representative of a pointer to a first location in system memory circuitry; and
      enqueue the pointer to one of a plurality of queue circuits:
   a plurality of accelerator circuits;
   hardware resource management circuitry to dynamically allocate the plurality of accelerator circuits between the plurality of processor circuits;
   direct memory access (DMA) circuitry coupled to the plurality of accelerator circuits, the DMA circuitry to:
      receive the pointer from the queue manager circuitry;
      read data at the first location in the system memory circuitry;
      fetch input data from a second location in the system memory circuitry;
      select at least one of the plurality of accelerator circuits based on the dynamic allocation of accelerator circuits to the respective processor by the hardware resource management circuitry;
      provide the input data to the selected at least one of the plurality of accelerator circuits allocated to the respective processor;
      receive output data from the selected at least one of the plurality of accelerator circuits allocated to the respective processor; and
      transfer the output data to a third memory location in the system memory circuitry.

2. The accelerator of claim 1, the DMA circuitry to further:
   generate a notification in response to the transfer of the output data to the third location in the system memory; and
   notify the respective processor of the third memory location in the system memory circuitry.

3. The accelerator of claim 1 wherein the plurality of accelerator circuits comprises a plurality of 5G maximum likelihood detection (MLD) accelerator circuits.

4. The accelerator of claim 1 wherein the plurality of accelerator circuits comprises at least one of: a plurality of 4G uplink forward error correction (UL FEC) accelerator circuits or a plurality of 5G UL FEC accelerator circuits.

5. The accelerator of claim 1 wherein the plurality of accelerator circuits comprises at least one of: a plurality of 4G downlink forward error correction (DL FEC) accelerator circuits or a plurality of 5G DL FEC accelerator circuits.

6. The accelerator of claim 1, the queue manager circuitry to:
   receive the request from a communicably coupled processor circuit.

7. The accelerator of claim 1, the queue manager circuitry to:
   receive the request from a communicably coupled virtual machine.

8. The accelerator of claim 1, the DMA circuitry to:
   read data representative of a descriptor at the first location in the system memory circuitry.

9. A server system, comprising:
   a plurality of processor circuits;
   system memory circuitry; and
   an accelerator disposed remote from the plurality of processor circuits, the accelerator comprising:

queue manager circuitry to:
  receive a request from one of a plurality of processor circuits, the request including information indicative of a priority and data representative of a pointer to a first location in system memory circuitry; and
  enqueue the pointer to one of a plurality of queue circuits:
a plurality of accelerator circuits;
hardware resource management circuitry to dynamically allocate the plurality of accelerator circuits between the plurality of processor circuits;
direct memory access (DMA) circuitry coupled to the plurality of accelerator circuits, the DMA circuitry to:
  receive the pointer from the queue manager circuitry;
  read data at the first location in the system memory circuitry;
  fetch input data from a second location in the system memory circuitry;
  select at least one of the plurality of accelerator circuits based on the dynamic allocation of accelerator circuits to the respective processor by the hardware resource management circuitry;
  provide the input data to the selected at least one of the plurality of accelerator circuits allocated to the respective processor;
  receive output data from the selected at least one of the plurality of accelerator circuits allocated to the respective processor; and
  transfer the output data to a third memory location in the system memory circuitry.

10. The server system of claim 9 wherein the second location in the system memory circuitry and the third location in the system memory circuitry are the same memory location in the system memory circuitry.

11. The server system of claim 9, the DMA circuitry to further:
  generate a notification in response to the transfer of the output data to the third location in the system memory; and
  notify the respective processor of the third memory location in the system memory circuitry.

12. The server system of claim 9 wherein the plurality of accelerator circuits comprises a plurality of 5G maximum likelihood detection (MLD) accelerator circuits.

13. The server system of claim 9 wherein the plurality of accelerator circuits comprises at least one of: a plurality of 4G uplink forward error correction (UL FEC) accelerator circuits or a plurality of 5G UL FEC accelerator circuits.

14. The server system of claim 9 wherein the plurality of accelerator circuits comprises at least one of: a plurality of 4G downlink forward error correction (DL FEC) accelerator circuits or a plurality of 5G DL FEC accelerator circuits.

15. The server system of claim 9, the queue manager circuitry to:
  receive the request from a communicably coupled processor circuit.

16. The server system of claim 9, the queue manager circuitry to:
  receive the request from a communicably coupled virtual machine.

17. The server system of claim 9, the DMA circuitry to: read data representative of a descriptor at the first location in the system memory circuitry.

18. An acceleration method, comprising:
  receiving, by queue management circuitry, a request from one of a plurality of processor circuits, the request including information indicative of a priority and data representative of a pointer to a first location in system memory circuitry;
  enqueuing, by the queue management circuitry, the pointer to one of a plurality of queue circuits;
  dynamically allocating, by hardware resource management circuitry, the plurality of accelerator circuits between the plurality of processor circuits;
  receiving, by direct memory access (DMA) circuitry, the pointer from the queue manager circuitry;
  reading, by the DMA circuitry, data at the first location in the system memory circuitry;
  fetching, by the DMA circuitry, input data from a second location in the system memory circuitry;
  selecting, by the DMA circuitry, at least one of a plurality of communicably coupled accelerator circuits, the selecting based on the dynamic allocation of accelerator circuits to the respective processor by the hardware resource management circuitry;
  providing, by the DMA circuitry, the input data to the selected at least one of the plurality of accelerator circuits allocated to the respective processor;
  receiving, by the DMA circuitry, output data from the selected at least one one of the plurality of accelerator circuits allocated to the respective processor; and
  transferring, by the DMA circuitry, the output data to a third memory location in the system memory circuitry.

19. The acceleration method of claim 18, further comprising:
  generating, by the DMA circuitry, a notification in response to the transfer of the output data to the third location in the system memory; and
  notifying, by the DMA circuitry, the respective processor of the third memory location in the system memory circuitry.

20. The acceleration method of claim 18 wherein selecting one of a plurality of communicably coupled accelerator circuits comprises:
  selecting, by the DMA circuitry, one of a plurality of communicably coupled 5G maximum likelihood detection (MLD) accelerator circuits.

21. The acceleration method of claim 18 wherein selecting one of a plurality of communicably coupled accelerator circuits comprises:
  selecting, by the DMA circuitry, at least one of: a plurality of 4G uplink forward error correction (UL FEC) accelerator circuits or a plurality of 5G UL FEC accelerator circuits.

22. The acceleration method of claim 18 wherein selecting one of a plurality of communicably coupled accelerator circuits comprises:
  selecting, by the DMA circuitry, at least one of: a plurality of 4G downlink forward error correction (DL FEC) accelerator circuits or a plurality of 5G DL FEC accelerator circuits.

23. The acceleration method of claim 18 wherein receiving a request information indicative of a priority and data representative of a pointer to a first location in system memory circuitry comprises:
  receiving, by queue management circuitry, a request from a communicably coupled processor circuit, the request including information indicative of a priority and data representative of a pointer to a first location in system memory circuitry.

24. The acceleration method of claim 18 wherein receiving a request information indicative of a priority and data representative of a pointer to a first location in system memory circuitry comprises:

receiving, by queue management circuitry, a request from a communicably coupled virtual machine, the request including information indicative of a priority and data representative of a pointer to a first location in system memory circuitry.

25. A non-transitory, machine-readable, storage device including instructions that, when executed by accelerator circuitry, cause the accelerator circuitry to:

receive a request from one of a plurality of processor circuits, the request including information indicative of a priority and data representative of a pointer to a first location in system memory circuitry;

enqueue the pointer to one of a plurality of queue circuits;

dynamically allocate the plurality of accelerator circuits between the plurality of processor circuits;

receive the pointer from the queue manager circuitry;

read data at the first location in the system memory circuitry;

fetch input data from a second location in the system memory circuitry;

select at least one of a plurality of communicably coupled accelerator circuits based on the dynamic allocation of accelerator circuits to the respective processor;

provide the input data to the selected at least one of the plurality of accelerator circuits allocated to the respective processor;

receive output data from the selected at least one of the plurality of accelerator circuits allocated to the respective processor; and transfer the output data to a third memory location in the system memory circuitry.

\* \* \* \* \*